US009158097B2

(12) United States Patent
Obrebski

(10) Patent No.: US 9,158,097 B2
(45) Date of Patent: Oct. 13, 2015

(54) OPTICAL ARRANGEMENT FOR CHANGING A MAGNIFICATION OR A REFRACTIVE POWER

(76) Inventor: Andreas Obrebski, Oberkochen (DE)

(*) Notice: Subject to any disclaimer, the term of this patent is extended or adjusted under 35 U.S.C. 154(b) by 0 days.

(21) Appl. No.: 13/642,211

(22) PCT Filed: Apr. 21, 2011

(86) PCT No.: PCT/DE2011/001001
§ 371 (c)(1),
(2), (4) Date: Oct. 19, 2012

(87) PCT Pub. No.: WO2011/150906
PCT Pub. Date: Dec. 8, 2011

(65) Prior Publication Data
US 2013/0201551 A1    Aug. 8, 2013

(30) Foreign Application Priority Data
Apr. 22, 2010   (DE) .................. 10 2010 018 498

(51) Int. Cl.
  *G02F 1/29*     (2006.01)
  *G02B 15/00*    (2006.01)
  *G02B 15/02*    (2006.01)
  *G02B 17/06*    (2006.01)
  *G02B 17/08*    (2006.01)
  *G02B 26/08*    (2006.01)

(52) U.S. Cl.
  CPC ............... *G02B 15/00* (2013.01); *G02B 15/02* (2013.01); *G02B 17/0694* (2013.01); *G02B 17/0896* (2013.01); *G02F 1/29* (2013.01); *G02B 26/0816* (2013.01)

(58) Field of Classification Search
  CPC .... G02B 27/0172; G02B 3/005; G02B 7/021; G02B 27/0176; G02B 27/10; G02B 27/1006; G02B 2027/0156; G02B 27/0101
  USPC ......... 359/320, 399, 401, 405, 432, 434–435, 359/79, 380, 381, 419–428, 618–640, 819, 359/821; 42/111, 119–120, 122–123, 42/130–131; 351/216–218
  See application file for complete search history.

(56) References Cited

U.S. PATENT DOCUMENTS

| | | | |
|---|---|---|---|
| 3,407,302 A | 10/1968 | Bouwers | |
| 3,459,464 A | 8/1969 | Hughes | |
| 3,645,602 A * | 2/1972 | Clave et al. | .................. 359/421 |
| 3,782,822 A * | 1/1974 | Spence | .......................... 356/21 |

(Continued)

FOREIGN PATENT DOCUMENTS

| | | |
|---|---|---|
| DE | 1802448 U | 12/1959 |
| DE | 102007029851 A1 | 2/2009 |

(Continued)

*Primary Examiner* — Thomas K Pham
*Assistant Examiner* — Sharrief Broome
(74) *Attorney, Agent, or Firm* — Osha Liang LLP

(57) ABSTRACT

Optical arrangement for varying a magnification or a refractive power in an optical path, wherein this optical arrangement as a whole encompasses at least two different possible magnifications or refractive powers, comprising a first optical element having a refractive power and a second optical element having a refractive power, characterized in that this optical arrangement comprises at least one optical switch, wherein the first optical element having a refractive power and the second optical element have a refractive power are spaced apart from one another.

26 Claims, 23 Drawing Sheets

(56) References Cited

U.S. PATENT DOCUMENTS

| | | | |
|---|---|---|---|
| 3,871,741 A | 3/1975 | Clave et al. | |
| 5,009,494 A | 4/1991 | Iossi et al. | |
| 5,121,220 A | 6/1992 | Nakamoto | |
| 5,282,087 A | 1/1994 | Wickholm et al. | |
| 6,061,175 A | 5/2000 | Watters | |
| 6,084,727 A | 7/2000 | Cook | |
| 6,970,286 B1 | 11/2005 | Kunick | |
| 2003/0169421 A1 | 9/2003 | Ehbets | |
| 2006/0114534 A1* | 6/2006 | Batchko | 359/15 |
| 2006/0146399 A1* | 7/2006 | Cook | 359/366 |
| 2007/0019186 A1 | 1/2007 | Sung et al. | |
| 2007/0146710 A1* | 6/2007 | Kowarz et al. | 356/416 |
| 2008/0024732 A1 | 1/2008 | Klepp | |
| 2008/0024794 A1 | 1/2008 | Miyazaki et al. | |
| 2008/0266443 A1* | 10/2008 | Lee | 348/344 |
| 2009/0153860 A1 | 6/2009 | Bloch et al. | |
| 2010/0002288 A1* | 1/2010 | McDowall et al. | 359/318 |
| 2010/0148083 A1 | 6/2010 | Brown et al. | |

FOREIGN PATENT DOCUMENTS

| | | |
|---|---|---|
| FR | 2625572 A1 | 7/1989 |
| GB | 2244817 A | 12/1991 |
| GB | 2339619 A | 2/2000 |
| WO | 2010072218 A1 | 7/2010 |

* cited by examiner

Prior Art  Fig. 1a)

Prior Art

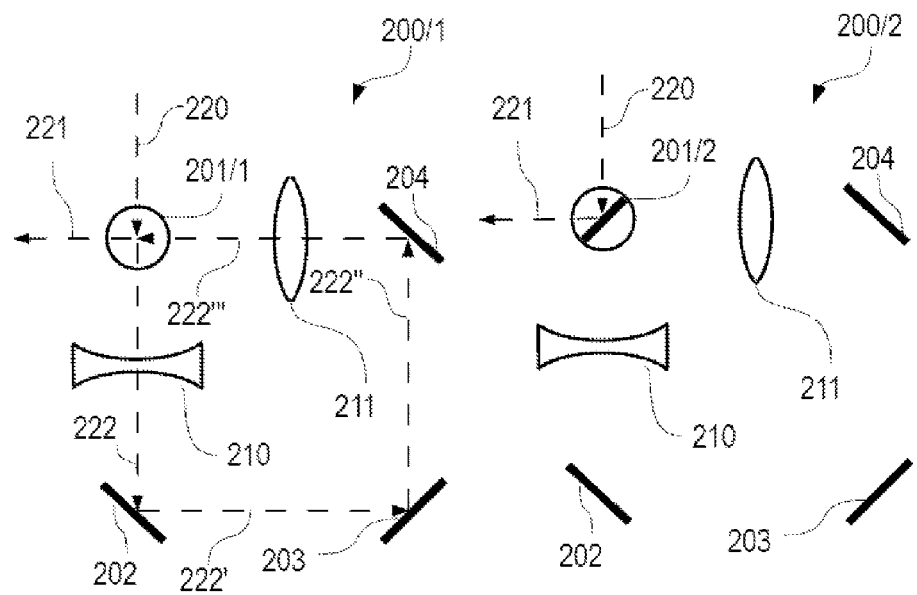
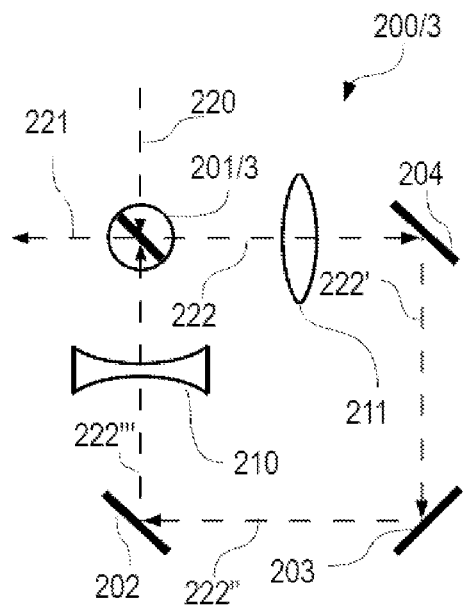
Fig. 4a) Fig. 4b)
Fig. 4c)

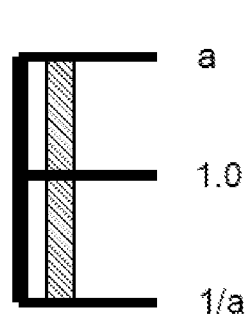
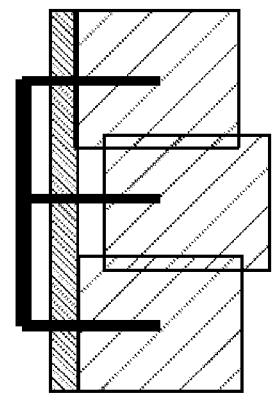
Fig. 19a)　　　　Fig. 19b)
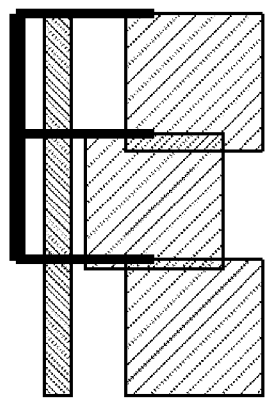
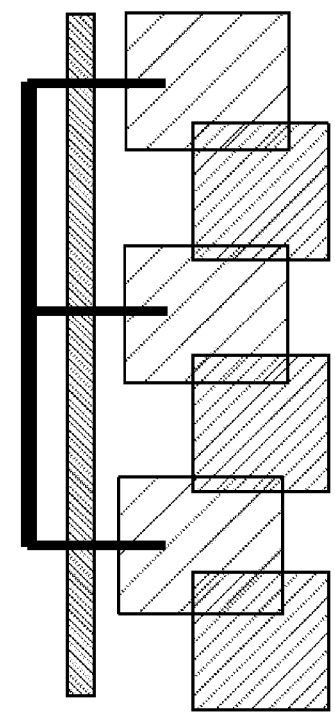
Fig. 19c)　　　　Fig. 19d)

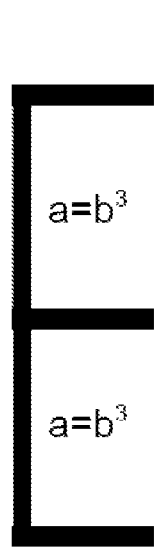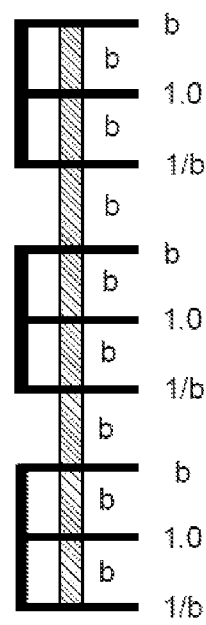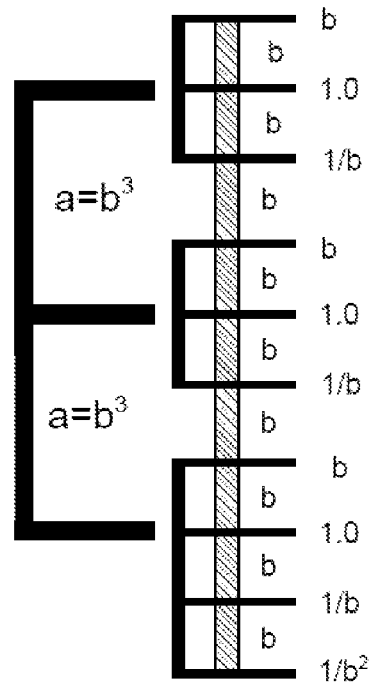
Fig. 20a)
Fig. 20b)
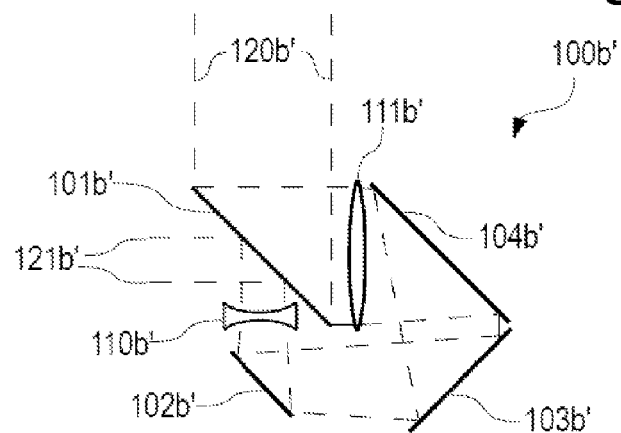
Fig. 21

OPTICAL ARRANGEMENT FOR CHANGING A MAGNIFICATION OR A REFRACTIVE POWER

SUBJECT MATTER OF THE INVENTION

The invention relates to an optical magnification changer and to an optical device or an apparatus containing such a changer.

MOTIVATION

The invention prompted a demand for small time constants (high speed) and a large dynamic range in the magnification in optical apparatuses comprising a "resolution", which is as large as possible (in the case of discrete magnification changers: many magnification stages), which is only fulfilled inadequately nowadays.

STATE OF THE ART

The optical zoom, which is used in cameras, camcorders, microscopes, etc., is most known in the case of magnification changers. A focal length modification takes place while maintaining the image plane location in an arrangement of at least three lenses, wherein two of said lenses are displaced relative to one another in a non-linear manner. The optical zoom is characterized by a continuous magnification range in the magnitude of typically between 3-10 in the case of cameras and 5-20 in the case of camcorders. The different ranges can be explained by generally different optical resolution of the apparatus types and this already represents one of the serious disadvantages of the optical zoom, the relatively large optical aberrations, which quickly become larger with an increasing magnification range and which only allow for small resolutions. In the case of the camcorders, a stronger zoom is thus allowed in response to the same effort, because the optical errors do not become apparent as quickly due to the smaller resolution. Further disadvantages: expensive, heavy, complicated mechanics, large, quality drops quickly with increasing dynamic range in the magnification, high development costs. Many zoom alternatives are not only discussed in patent specification, but also in books dealing with optics and reference will thus not made to them in detail.

The digital zoom is also known from the products from the consumer field (digital cameras, digital camcorders, cell phone cameras, etc.) as a further magnification changer. It is substantially realized by "magnification" of the pixel size of the camera chip, that is, the image section corresponding to one pixel is represented in an enlarged manner. Occasionally, the method is refined by interpolating between the pixels in terms of software and in that these interpolated pixels are added into the image, wherein the image size must subsequently be corrected again. This "refinement", however, does not mean that the resolution is improved, but the representation only appears to be "softer" and less grainy. The image remains less detailed and unfocussed. The resolution based on the object size remains; it deteriorates based on the image size. The quality decrease increases quickly with the magnification. The use of a digital zoom up to factor 1.3-1.5 seems to be just barely acceptable. Nonetheless, the digital zoom is used in photography at most at the amateur level. Occasionally, applications can also be found in the technical field, when the demands on the resolution are low. Recently, fun camcorders are offered with digital zoom. The implementation, however, is still relatively inferior, the zoom is unsteady and is not smooth by far, even though this should be possible with some effort. However, this still fails within the offered price segment. The digital zoom is more recent than the optical zoom, but is anything but improved in the current implementation.

Discrete magnification changers are mainly offered in the case of microscopes. For the most part, Galileo telescopes are thereby brought into the afocal optical path, wherein they are in each case used in two positions and thus offer two magnification stages for each telescope arrangement. Between two and six magnification stages are offered with up to three telescope arrangements, optionally comprising one free passage for each optical path, wherein three and five stages are most common. Discrete magnification changers offer a good optical quality and can thereby be developed in a relatively simple manner in view of mechanics and optics. However, they are large, heavy, sluggish and slow and in addition do not provide a continuous magnification change. In the case of more than three magnification stages, the magnification change does not take place intuitively and must be assessed as not being ergonomic. One example can be seen in FIG. 1.

A further development of the discrete magnification changer is described in DE 10 2007 039 851 A (FIGS. 2a and b). The arrangement is faster, smaller, mechanically less extensive, of the same optical quality as the common discrete magnification changer, and additionally uses less energy. A combination with zoom having lenses of a variable refractive power eliminates the important disadvantage that a continuous magnification range cannot be accessed. During operation, however, parts of the arrangement leave the plane of the optical path, which again eliminates a part of the advantage compared to the common discrete magnification changers. The question also arises, whether it is possible to further reduce the energy and space requirement.

In the case of the above-mentioned zoom with lenses having a variable refractive power (see U.S. Pat. No. 7,411,739 B2 and US 2009/0021843 A1), two lenses having a variable refractive power are typically controlled in opposite direction in response to detuning. In the case of this alternative, no optical elements are moved. In the case of another alternative, an optical element is moved linearly, while a lens having a variable refractive power is controlled. This zoom is easy, quick, small, uses little energy, but has a rather small dynamic range in response to a reasonable optical quality.

OBJECT

It is thus the object of the instant invention to provide a magnification changer, which does not encompass the above-mentioned disadvantages, which in each case maintains the possibly present advantages and which provides new advantages, which is in particular quick, light, can be manufactured easily, can be developed easily, can manage without moved parts or with few (preferably only one) or only few moved parts, which saves space and the elements of which are preferably arranged in one plane, which can manage with as few as possible optical elements, which are as simple as possible, which offers a high degree of reliability and durability due to simple mechanics and which thereby offers a maximum magnification dynamic and a maximum number of magnification stages, if not continuous detuning.

This object is solved by means of the magnification changer according to the invention according to independent claim 1. Advantageous further developments can be found in the subclaims.

DESCRIPTION

In the case of the discrete magnification changers according to the state of the art, complete telescope arrangements, often a plurality thereof, are moved in response to changing magnification. The idea of this invention is not to move the many optical elements for changing a magnification or a refractive power, but to substantially switch the optical path by means of an optical switch such that the optical path passes through a telescope arrangement or arrangements, e.g., at different points in time, preferably in different, opposite directions or not at all. A telescope arrangement would thus have two of 1 different magnifications a and 1/a if the optical path were to pass through it in opposite directions in each case. Bypassing the telescope arrangement would mean the magnification equal 1. The telescope arrangement preferably consists of at least two optical elements having one refractive power. These optical elements must be spaced apart. In the event that the optical path is to not be afocal on at least one side of the telescope arrangement, one can refer to a (total) refractive power instead of to a magnification.

At least one optical element having a refractive power, thus, e.g., the first optical element having a refractive power or the first optical element having a refractive power and the second optical element having a refractive power are preferably stationary. Relative to the rest of the arrangement, the stationary optical elements are preferably, but not mandatorily, immovable.

On principle, optical elements are stationary when they substantially remain at their location during operation; they are preferably also immovable. Stationary is to signify herein: each point of an element can move maximally 1.2-times, preferably maximally 1-times, more preferably 0.8-times, more preferably 0.5-times, optimally 0.3-times the largest simple diameter of the element, preferably for switching purposes. This is to allow for the swivel movements, rotation about an axis within the optical element and up to 20% of the largest simple diameter of the element spaced apart from the element and the like, but not for a rotation about an axis outside of this range or for larger linear movements.

The optical arrangement according to the invention is preferably characterized in that the first optical element having a refractive power and the second optical element having a refractive power can encompass at least two of the following three states as a function of the switching state of the at least one optical switch:
(i) light from the optical path shines first through the first optical element having a refractive power and then through the second optical element having a refractive power in this order
(ii) light from the optical path shines first through the second optical element having a refractive power and then through the first optical element having a refractive power in this order
(iii) light from the optical path does not at all shine through the first optical element having a refractive power and through the second optical element having a refractive power. They are located outside of the optical path.

In the optical arrangement according to the invention, the first optical element having a refractive power and the second optical element having a refractive power preferably form a Galileo or a Kepler telescope. The optical path at the input and/or at the output of the arrangement is preferably, but not mandatorily, afocal.

The optical arrangement according to the invention is preferably characterized in that an optical switch has 2, 3, 4 or 5 switching states. The arrangement can also comprise a plurality of (partial) switches.

The optical arrangement according to the invention preferably comprises at least one direction-changing element for the optical path. Preferably, the at least one direction-changing element for the optical path is stationary. The at least one direction-changing element for the optical path acts in a reflective, optically refractive, optically diffractive or waveguiding manner. The reflective direction-changing element for the optical can thereby be a mirror or a prism, the refractive direction-changing element for the optical path can be a prism and the diffractive direction-changing element for the optical path can be an optical lattice or a DOE (diffractive optical element).

Preferably, the first optical element having a refractive power and the second optical element having a refractive power of the optical arrangement according to the invention are lenses or mirrors or a lens and a mirror.

The optical arrangement according to the invention can preferably comprise at least one optical element having a variable refractive power. The at least one optical element having a variable refractive power can be used for a zoom and/or for an autofocus and/or for an optical image stabilization (anti-jitter device) and/or for a residual correction of the optical errors of the arrangement.

As does a discrete magnification changer according to the state of the art, the optical arrangement according to the invention can also be described together with a further discrete or continuous magnification changer within an optical path. This further discrete or continuous magnification changer can be a continuous optical zoom, a zoom with lenses having a variable refractive power, a digital zoom, a Galileo changer, a Kepler changer, a changer with or without intermediate image or a further changer according to the invention. The consecutive switching of two or more discrete magnification changers forms a cascade. Assuming that the individual changers provide 2, 3 or 4 magnification stages for each changer, e.g., a twofold cascade has 4, 6, 8, 9, 12 or 16 magnification stages (2×2=4, 2×3=6, 3×3=9, 2×4=8, 3×4=12 and 4×4=16). Under the same assumption, a threefold cascade has, e.g. 8, 12, 16, 18, 24, 27, 36, 48 or 64 magnification stages (2×2×2=8, 2×2×3=12, 2×3×3=18, 3×3×3=27, 2×2×4=16, 2×3×4=24, 3×3×4=36, 3×4×4=48 and 4×4×4=64). In the event that a discrete magnification changer or a discrete cascade is supplemented by a continuous zoom, a quasi continuous magnification changer arrangement comprising a high optical quality and a large dynamic range is obtained. The continuous zoom thereby requires a relatively small dynamic range, which is slightly larger than the discrete magnification stages, so as to cover a large dynamic range in interaction with the discrete changer or the cascade. It goes without saying that the zoom can, but must not be considerably larger. It goes without saying that the cascades can also comprise changers with five or more magnification stages. The number of the magnification stages of a cascade is calculated, as before, as a product of the numbers of the magnification stages of each magnification changer, which acts as cascade stage. One cascade can have two or three, but also more, e.g. four or five cascade stages, as is the case herein.

The optical switch of the optical arrangement according to the invention can be a switchable mirror without movable parts, a switchable mirror comprising at least one movable part, a movable polarizer, a polarization rotator or a switchable polarization cube, a switchable lens or another optical element with at least two switching states. The switching function of the optical switch can be distributed to two or more elements of the arrangement.

In addition to the two optical elements having a refractive power, further optical elements having a refractive power can be capable of being switched on or can be capable of being introduced into the optical path of the arrangement.

Preferably, the used lenses encompass spherical or hyperboloid surfaces. Preferably, the used mirrors encompass spherical or hyperboloid surfaces or paraboloid surfaces. The spherical surfaces can be produced in a simple manner and are relatively cheap, the hyperboloid surfaces and paraboloid surfaces provide an improved optical quality (spherical aberrations do not appear).

To some extent, the optical arrangements according to the invention described herein transmit a different amount of light as a function of the magnification, due to a different number of optical elements in the optical path. This dependency is kept low by means of suitable measures, e.g. suitable coating (high reflexivity in the case of mirrors, antireflection coating in the case of lenses, etc.). In the event that the observation is made using one eye, the dependency cannot even be perceived due to the logarithmical intensity sensitivity of the eye. In the case of an electronic observation, the sensitivity of the detection device can be coupled to the transmission and/or to the intensity, which is allowed to pass.

The optical arrangements according to the invention, which are described herein, are suitable for optical observation as well as for optical illumination paths.

It is to be noted that the term optical element refers to a lens, a mirror, a prism, etc., but also to a group of optical elements, in particular when this group can replace an individual optical element with reference to refractive power, but encompasses or can encompass different advantageous characteristics as compared to this individual optical element, such as, e.g., fewer optical errors. The term lens would thus also refer to achromatic lenses, which are comprised of two or more lenses, and aprochromatic lenses, embodied as contact or cemented element. This also refers to groups of different optical elements, e.g. DOE (diffractive optical element) on a lens or a mirror.

The term "optical" relates to any type of electromagnetic radiation, thus not only to visible light, but also IR, UV, Terahertz, microwave, radio wave radiation, etc.

The disclosure of the documents cited in this application is hereby adopted in its entirety by reference.

Some of the preferred embodiments of the optical arrangement according to the invention will be described in more detail by means of the following drawings.

FIG. 1 shows a fivefold Galileo changer according to the state of the art
   a) optical arrangement
   b) optical path in a Galileo telescope
   c) optical path in a Kepler telescope FIG. 2 shows a sixfold Galileo changer of a newer type according to the state of the art
   a) top view onto the plane vertically to the optical path at the input and output and to the axis of rotation of the changer
   b) top view onto the optical path plane FIG. 3 shows a magnification changer according to the invention comprising alternatives for its lens positions
   a) lens arrangement with Galileo telescope inspired by DE 10 2007 039 851 A
   b) lens arrangement with Galileo telescope for larger distance and better quality
   c) lens arrangement with Kepler telescope FIG. 4 shows different magnification stages realized with a movable mirror as example for an optical switch
   a) switch switched to passage
   b) switch switched to 90° deflection
   c) switch switched to −90° deflection FIG. 5 shows an exemplary embodiment of the optical switch
   a) movable part of the switch
   b) switch with two possible positions, top view
   c) switch in a further position, top view and details in side view FIG. 6 shows a magnification changer according to the invention: alternative with less space requirement.

FIG. 19 shows magnification stages and ranges for a threefold magnification changer:
   a) discrete magnification changer alone
   b) discrete magnification changer supplemented by a zoom with lenses having a variable refractive power
   c) discrete magnification changer supplemented by a digital zoom
   d) discrete magnification changer supplemented by a zoom with lenses having a variable refractive power and a digital zoom.

FIG. 20 shows magnification stages and ranges for a twofold cascade of two magnification changers according to the invention in each case with a threefold magnification changer.
   a) discrete magnification changer alone
   b) discrete magnification changer supplemented by a zoom with lenses having a variable refractive power and/or a digital zoom.

Figures 3A, 3B:
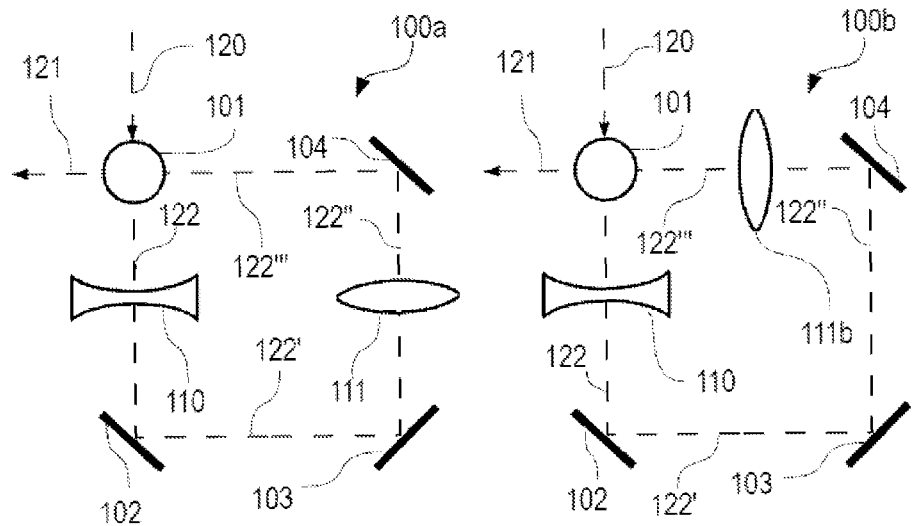

FIG. 21 shows a space-saving embodiment for an optical arrangement according to FIG. 3b).

Figure 1B:
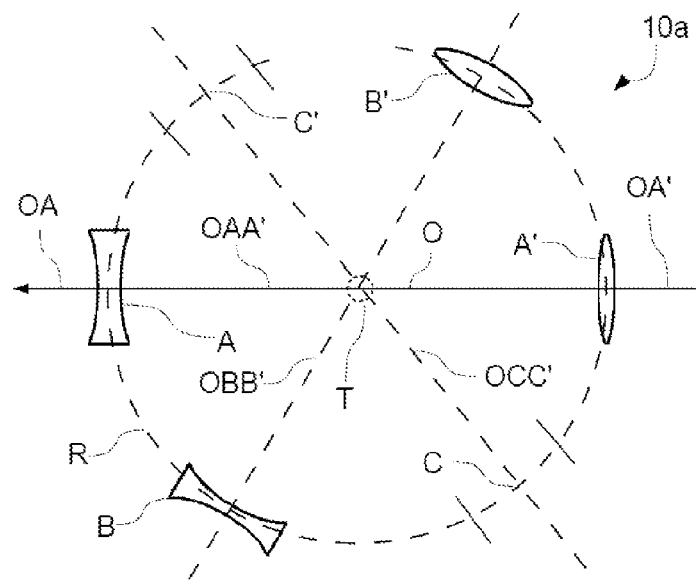
Figure 1B:
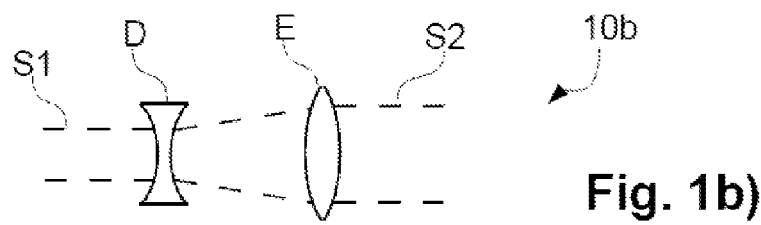

FIG. 22 shows a comparison of the magnification courses
  a) course of the magnification in a twofold cascade with threefold changers.
  b) course of the magnification in a fivefold changer magnification changer according to FIG. 1.

FIG. 23 shows a magnification changer according to the invention with optical arrangement at right angles to the remaining optical path: a further alternative.
  a) mirror as switch switched to 90° deflection
  b) mirror as switch switched to passage
  c) mirror as switch switched to −90° deflection.

Figure 24A:
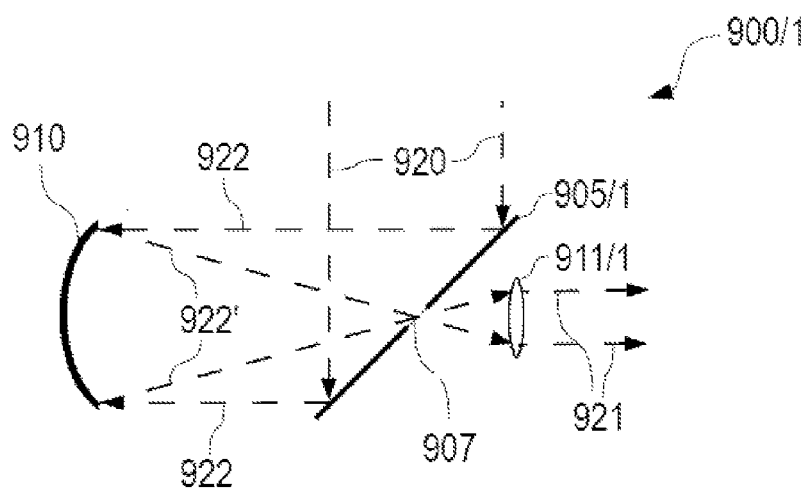
Figure 24B:
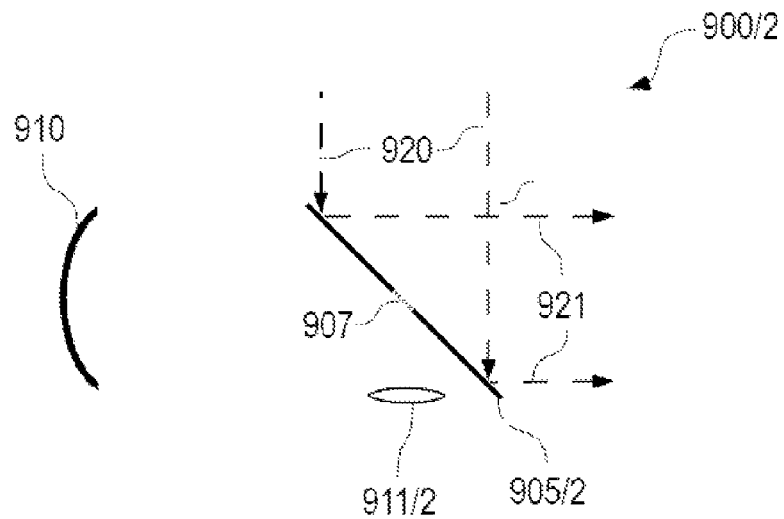

FIG. 24 shows a magnification changer according to the invention with optical arrangement at right angles to the remaining optical path: a further, catadioptric alternative, Kepler arrangement.
  a) mirror as switch switched to 90° deflection
  b) mirror as switch switched to −90° deflection.
  c) mirror as switch switched to passage.

Figure 25:
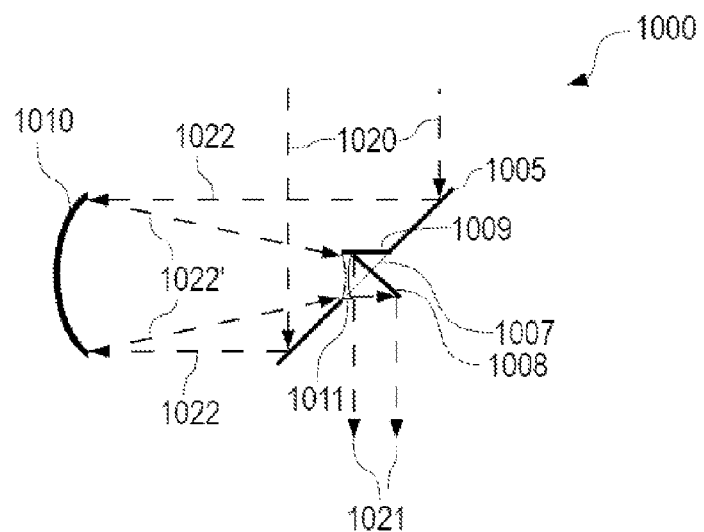

FIG. 25 shows the magnification changer according to the invention with optical arrangement at right angles to the remaining optical path: a further catadioptric alternative, Galileo arrangement.

Figure 26:
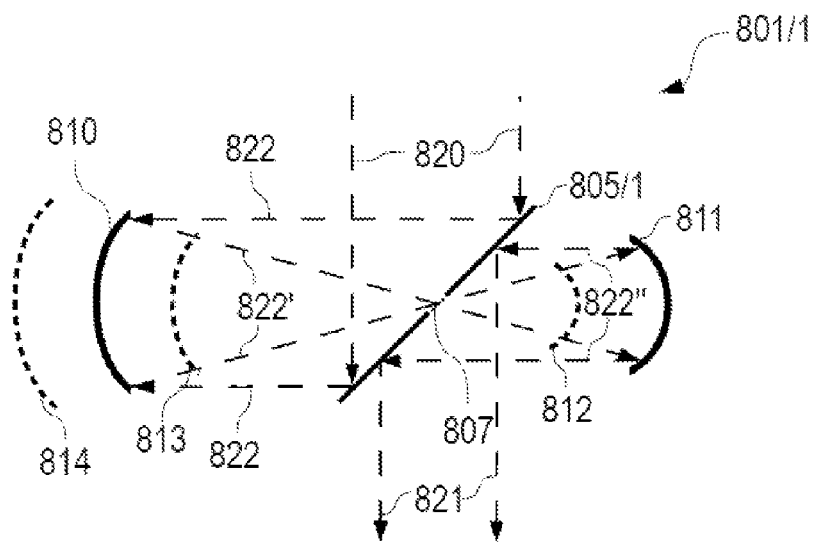

FIG. 26 shows a magnification changer according to the invention with optical arrangement at right angles to the remaining optical path: a further alternative with thirteen magnification stages.

Figure 27:
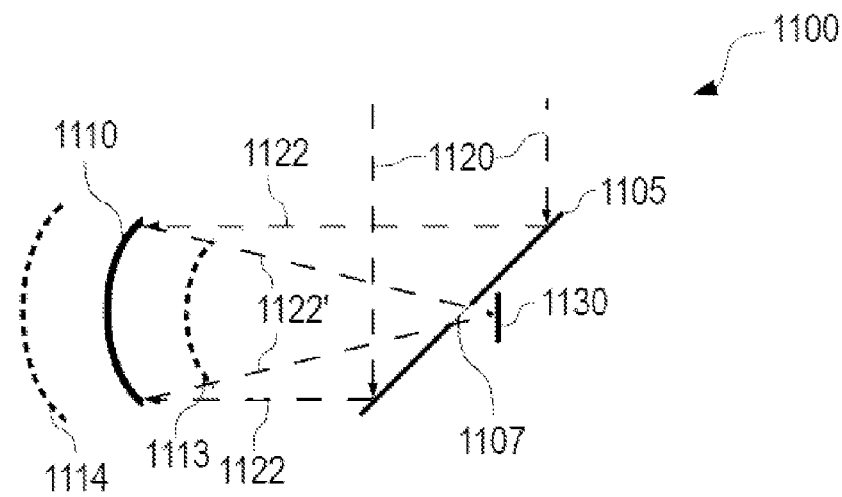

FIG. 27 shows a camera with switching lens and coupling according to the invention with three mirrors, at least two of which can be switched.

Figure 28:
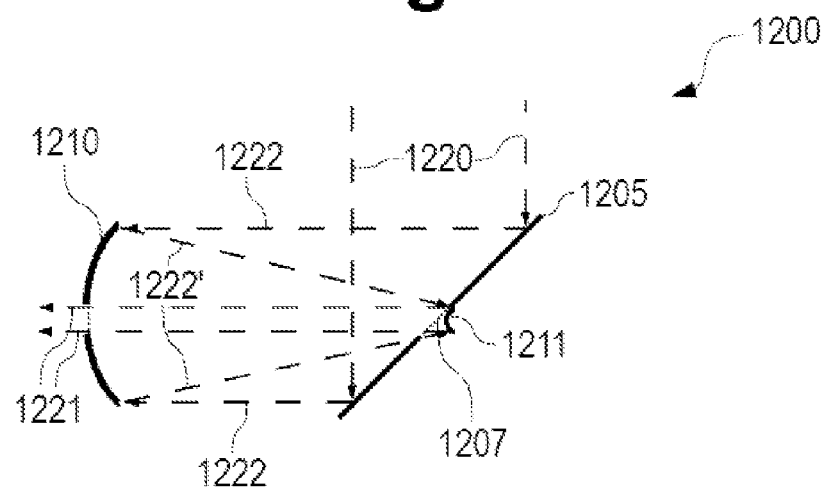

FIG. 28 shows a magnification changer according to the invention with optical arrangement at right angles to the remaining optical path: a further, catadioptric alternative, a further Galileo arrangement.

Figure 29:
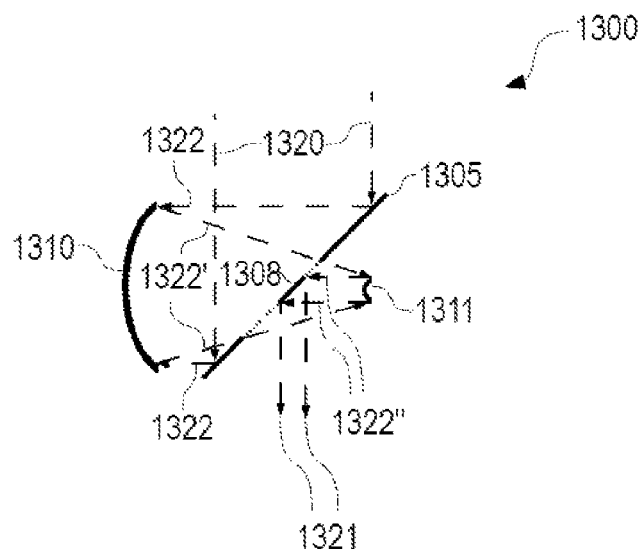

FIG. 29 shows a magnification changer according to the invention with optical arrangement at right angles to the remaining optical path: a further alternative exclusively with mirrors.

Figure 30:
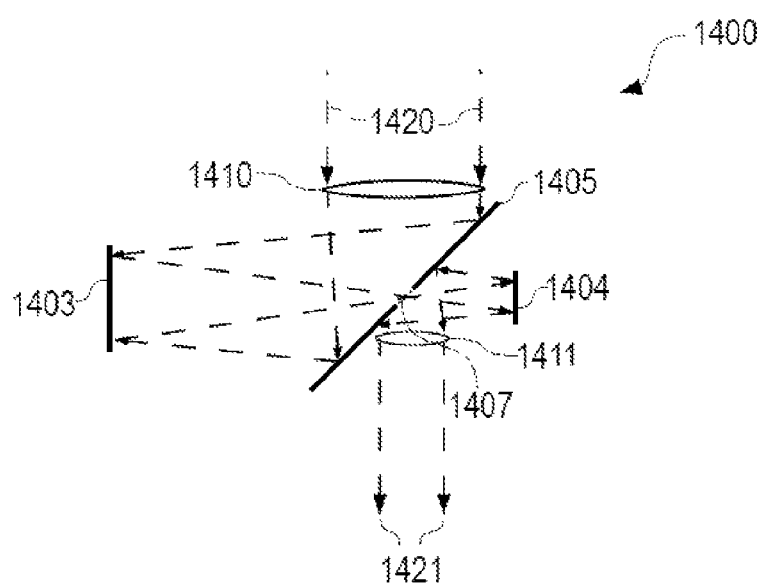

FIG. 30 shows a magnification changer according to the invention with optical arrangement, folded at right angles to the remaining optical path: a further alternative exclusively with lenses.

Figure 31:
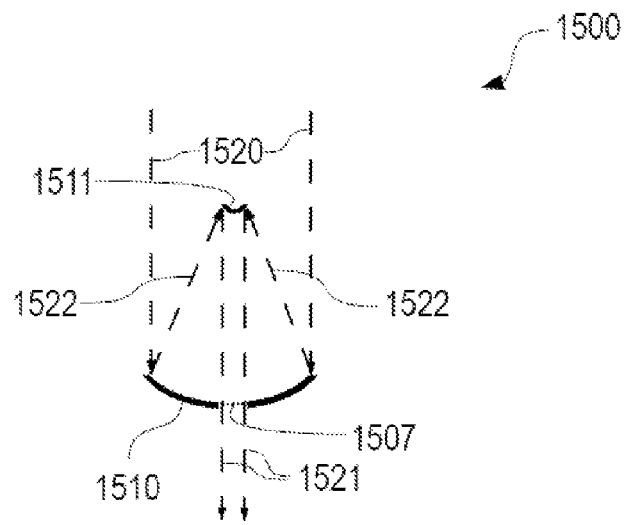

FIG. 31 shows a magnification changer according to the invention with optical arrangement parallel to the remaining optical path, a Galileo arrangement with mirrors.

FIG. 32 shows a magnification changer according to the invention with optical arrangement parallel to the remaining optical path, a Kepler arrangement
  a) with mirrors
  b) catadioptric.

FIG. 1a) shows a common fivefold Galileo changer 10a. The two Galileo telescope arrangements are formed by the lens pairs A and A' as well as B and B', wherein the optical axes OA and OA' of the lenses A and A' coincide and form the optical axis OAA' of the telescope AA' and the optical axes OB and OB' of the lenses B and B' coincide and form the optical axis OBB' of the telescope BB'. In addition, there is also space for the free passage CC'. The lenses are arranged in a ring-shaped manner, e.g. on a ring R, so as to be capable of rotating about the axis of rotation T. In the event that the optical axis OAA' of the telescope AA' coincides with the optical axis O of the optical path, the arrangement has a magnification a when light first passes through the lens A' before passing through lens A (the case shown in the illustration) and has the magnification 1/a when light first passes through the lens A and then through the lens A' (when the ring R with the lenses has been rotated by 180°). Similarly, the magnification of the arrangement equals b when the optical axis OBB' of the telescope BB' coincides with the optical axis O of the optical path and when light first passes through the lens B' before passing through the lens B (the ring in the illustration was rotated by 60° in clockwise direction) and the magnification of the arrangement equals 1/b when the optical axis OBB' of the telescope BB' coincides with the optical axis of the optical path and when light first passes through the lens B before passing through the lens B' (the ring in the illustration was rotated by 240° in clockwise direction or by 120° in counter-clockwise direction). In the event that the optical axis OCC' of the free passage CC' coincides with the optical axis of the optical path, the magnification 1 is independent from orientation, as expected. The lens pairs are in each case formed by one negative lens and one positive lens; a Galileo arrangement without an intermediate image is thus present. Lens pairs in each case consisting of two positive lenses are also possible. This would be the Kepler arrangement, in each case comprising an intermediate image. On the one hand, however, the Kepler arrangement requires considerably more space, on the other hand, the optional free passage cannot be realized easily, because it does not effect an image reversal, just as the Galileo arrangement, but the Kepler arrangement does. The Kepler arrangement comprising a free passage would thus additionally require a swivelable image reversing device or a special software option for the occasional image reversal, in the case of a camera chip detector.

In the case of the common Galileo changer, the unfavorable mass distribution is obvious immediately, because the entire mass of the optical elements is arranged to the very outside. Together with the large dimensions, this causes the high sluggishness of the arrangement. Only five magnification stages are often not satisfactory for the user with this size of the arrangement.

Figure 1C:
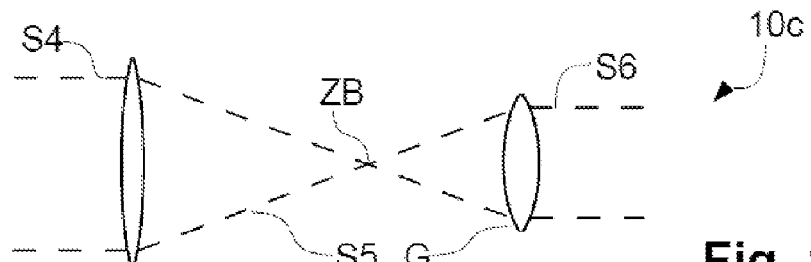

FIG. 1b) shows the optical path in a Galileo telescope 10b, as it is used in a Galileo changer, e.g. according to FIG. 1a). The afocal optical path S1 is widened by the negative lens D towards the optical path S2 and is transferred back into an afocal optical path S3 with a (here) larger diameter than that of S1 by means of the positive lens E. In FIG. 1c), the optical path is shown in a Kepler telescope 10c. The afocal optical path S4 is focused through the lens F in the optical path S5 and is transferred back into an afocal optical path S6 through the lens G, wherein the intermediate image ZB is created.

Figure 2A:
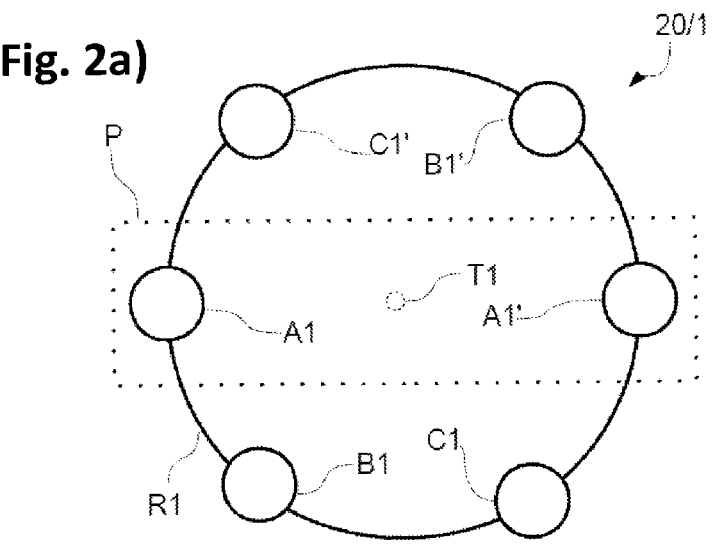
Figure 2B:
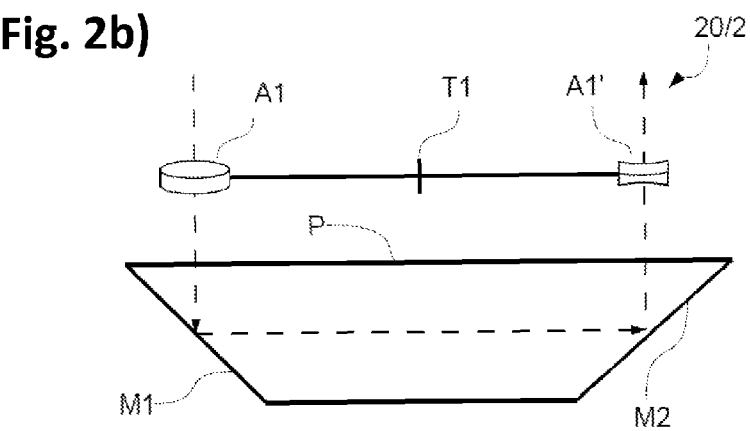

FIGS. 2a) and b) show a further development of the common arrangement of a magnification changer according to the state of the art, wherein FIG. 2a) shows the view in/opposite the direction of the optical path and FIG. 2b) shows the top view onto the plane of the optical path. The arrangement is described in more detail in DE 10 2007 039 851 A, the disclosure of which is adopted in its entirety by reference. The lenses A1, A1', B1, B1', C1, C1' are also arranged on a rotatable ring, here R1. However, the arrangement is such that the optical axes (e.g. OA1, OA1', ...) of the lenses run parallel to the axis of rotation T1 of the arrangement, instead of vertically intersecting the axis of rotation T as in FIG. 1a). The optical path is folded by means of the mirrored surfaces M1 and M2 within the prism P. Instead of the prism, a simple mirror, but also pentaprisms could have been used. In the illustrated position of the arrangement, the optical path first runs through the positive lens A1, is deflected at M1 by 90°, is deflected once again at M2 by 90° and then runs through the negative lens A1' and leaves the arrangement. By rotating the ring R1 with the lenses, the other lens pairs B1, B1' and C1, C1' can also be brought into the optical path, namely such that the lens of the lens pair (A1, B1 or C1) is brought into the optical path as first lens (on the left in FIG. 2) or as second lens (on the right in FIG. 2). Accordingly, the magnifications are a, b and c in the first case and 1/a, 1/b and 1/c in the second case. The arrangement has the advantage that the volume, which has been taken, can be considerably smaller than in the arrangement from FIG. 1a).

FIG. 3 shows a first alternative of the magnification changer according to the invention by means of three examples. In FIG. 3a), the light of the preferably afocal optical path 120 enters into the arrangement from the top through the switch 101 and also leaves the arrangement through the same switch 101 also preferably as an afocal optical path 121. Occasionally, it is possible for the optical path to run through the lens 110 as optical path 122, is deflected at the mirror 102 by 90°, is deflected by further 90° at the mirror 103 as optical path 122', then runs through the lens 111 as optical path 122" so as to then be deflected by a further mirror 104 and so as to finally reach the switch 101 as optical path 122'''. The light would thus propagate within the arrangement in counter clockwise direction, or the light propagates exactly in opposite direction in clockwise direction with the optical path (see also FIG. 4c). The lenses 110 and 111 preferably form a telescope arrangement. The lower part of the illustration corresponds to FIG. 2b), wherein the lens A1 has been replaced by the lens 110 and the lens A1' has been replaced by the lens 111. The reflections take place at mirrors 102 and 103, in place of the prism P with the inner surfaces M1 and M2. The significant difference is that the lenses 110 and 111 are not movable and thus remain in the optical path plane, whereas the lenses A1 and A1' leave the optical path plane towards the top or the bottom in response to the magnification change, which manifests itself in a corresponding space requirement.

On principle, all of the optical elements in FIGS. 3a), b) and c) as well as in most of the arrangements introduced herein are stationary, that is, they substantially remain at their location during operation. Preferably, they are also not movable. Stationary is to signify herein: each point of an element can maximally move 1.2-times, preferably maximally 1-times, more preferably maximally 0.8-times, more preferably maximally 0.5-times, optimally maximally 0.3-times the largest simple diameter of the element, preferably for switching purposes. This is to allow for the swivel movements, rotation about an axis within the optical element and up to 20% of the largest simple diameter of the element spaced apart from the element and the like, but not for a rotation about an axis outside of this range or for larger linear movements.

Figure 3C:
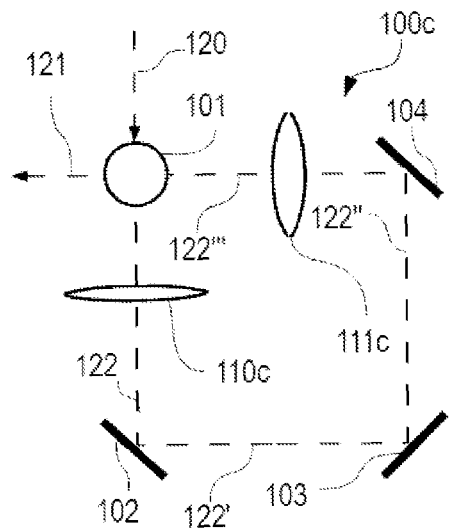

The position of the lens 111b as compared to the position of 111 from FIG. 3a) has been changed in FIG. 3b). In FIG. 3b), it is between the switch 101 and the mirror 104, instead of between the mirrors 103 and 104. The optical path between the two lenses thus increased by approx. 50% and is three times larger than if the lens 111b were located between the mirrors 102 and 103. This can have a positive effect on the optical quality of the arrangement (the light is refracted less) or could signify a higher magnification with the same quality and effort or could, in turn, allow for the use of a considerably more space-intensive Kepler arrangement comprising two positive lenses, which is illustrated in FIG. 3c). The observations relating to the optical path correspond to those of FIG. 3a) and can be understood immediately by the person of skill in the art. The details in context with the different switch positions of the optical switch will be discussed below. In addition, the position of the lenses 110 and 111 within the optical path loop with starting and end point switch 101 can be chosen virtually arbitrarily. These lenses could thus both be arranged between the switch 101 and the mirror 102. In the case of the same magnification, however, this arrangement would have larger optical errors. The arrangement according to FIG. 3 encompasses a considerably lower inertia than the arrangements according to FIG. 2 and in particular according to FIG. 1a). The reason is to be seen in that the entire arrangement must not be moved across large paths, as in the case of the arrangements according to FIGS. 1a) and 2, but only relatively small parts of the switch or, when using specific optical switches (see further below), nothing must be moved at all. In addition, the arrangement according to FIG. 3 is only located in one plane and can encompass advantages as compared to the arrangement according to FIG. 2, as far as space requirement.

The optical path loop from and to the optical switch 101 preferably comprises a telescope arrangement, which can be passed through at least in one direction, preferably in both directions. In addition, the selection of the deflection angles of 90° is not mandatory. Other angles could also be chosen for the circulation loop from and to the optical switch.

FIG. 4 explains the realization of different magnification stages with a switchable mirror 201.as example for an optical switch. In FIG. 4a), the preferably afocal optical path 220 enters into the optical switch 201 in the position 1 (201/1) "open" (the switchable mirror is switched to transmission). The optical switch 201 allows the light of the optical path to pass unhindered. This position is realized clearly, e.g. by folding a movable mirror, which serves as switch 201, away from the optical path or by switching a switchable mirror from the reflection into the transmission mode. The optical path passes through the lens 210, is deflected at the mirror 202 by 90°, further runs to the mirror 203, at which it is deflected by further 90° and then runs through the lens 211 and finally reaches the switch 201, which in turn allows the light to pass unhindered as optical path 221. The passage through the Galileo telescope of lenses 210 and 211 in this order supplies the magnification a here. An example for a switchable, movable mirror is introduced in FIG. 5. It can be replaced by a switchable, immovable mirror. Such mirrors are known per se, but are not very common. They can be found, e.g., in US 2009/0002822 A1, U.S. Pat. No. 6,999,649 B1, US 2003/0108276 A1, US 2008/0252833 A1, U.S. Pat. No. 5,798,057, U.S. Pat. No. 5,762,823 and U.S. Pat. No. 7,042,615 B2 or http://www.kentoptronics.com/mirror.html, the content of which is hereby adopted in its entirety by reference. These mirrors can be obtained by KentOptronics, Inc., in Hopewell Junction, N.Y./USA, e.g.

In FIG. 4b), the optical path 220 enters into the optical switch 201 in position 2 (201/2) "+90". The optical switch 201 deflects the light of the optical path by 90° in clockwise direction. This switch position is realized by positioning the mirror, which serves as switch 201, under an angle of 45° in the optical path. Due to the fact that the optical path is not influenced by the lenses 210 and 211, the magnification 1 is obtained in this switch position. This mirror position is realized, for example, by swiveling in a movable mirror (see FIG. 5) or by switching a correspondingly positioned, switchable, immovable mirror into the reflection mode when the mirror was in the transmission mode beforehand.

In FIG. 4c), the optical path 220 enters into the optical switch 201 in position 3 (201/2) "−90", which deflects the light of the optical path by 90°, in counter clockwise direction. This switch position is realized by positioning the mirror, which is mirrored on both sides and which serves as switch 201, under an angle of −45° in the optical path, for example by swiveling in a movable mirror (see FIG. 5) or by switching a correspondingly positioned, switchable, immovable mirror into the reflection mode when the mirror was in the transmission mode beforehand. The optical path passes through the lens 211, is deflected at the mirror 204 by 90°, runs further to the mirror 203, at which it is again deflected by further 90°, is then deflected by a further mirror 202 by further 90° and then runs through the lens 210 and finally reaches the switch 201, where it is again deflected by −90° and leaves the arrangement as optical path 221. The passage through the Galileo telescope of lenses 211 and 210 in this order supplies the magnification 1/a here. The statements made for FIG. 3 also apply, namely that the telescope could be a Kepler arrangement and that the lenses could be positioned at other locations in this arrangement. The optical switch could also offer only two (or more than three) positions. The arrangement would then only have two (or more than three) magnification stages. Further possible details relating to an exemplary solution for the optical switch will be discussed in context with FIG. 5. The use of a Kepler arrangement (e.g. in FIG. 3c)) or further Galileo arrangements (e.g. FIG. 3a)) are also possible.

FIG. 5 shows an example for a threefold optical switch. The switch is realized by means of a movable mirror and has three positions:

1. free passage: the mirror is folded away from the optical path
2. mirror under angle 45° in the optical path: reflection of the optical path under 90°
3. mirror under angle −45° in the optical path: reflection of the optical path under −90°

Figure 5A:
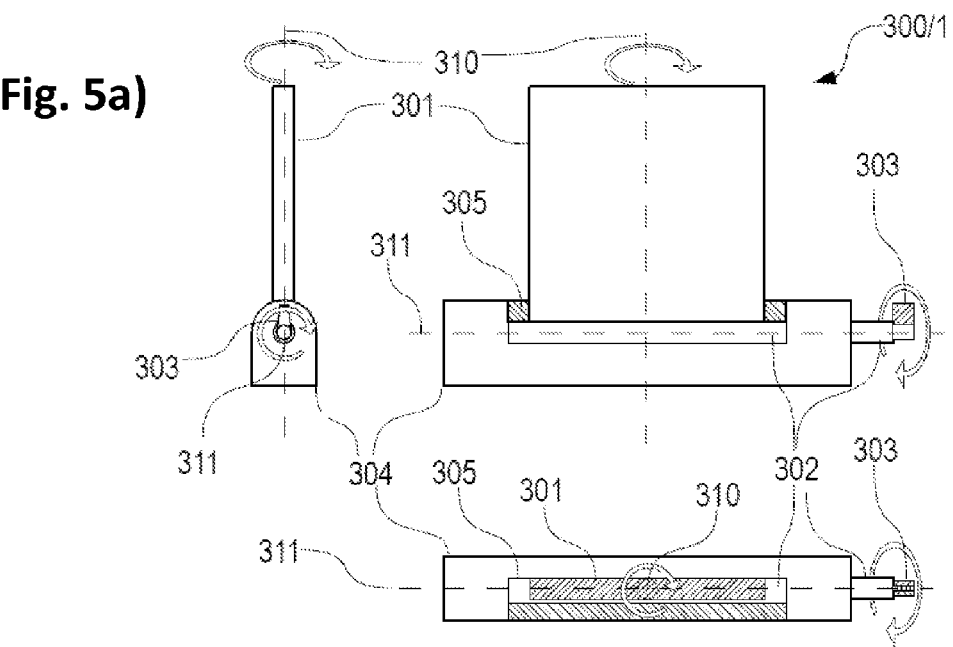
Figure 5B:
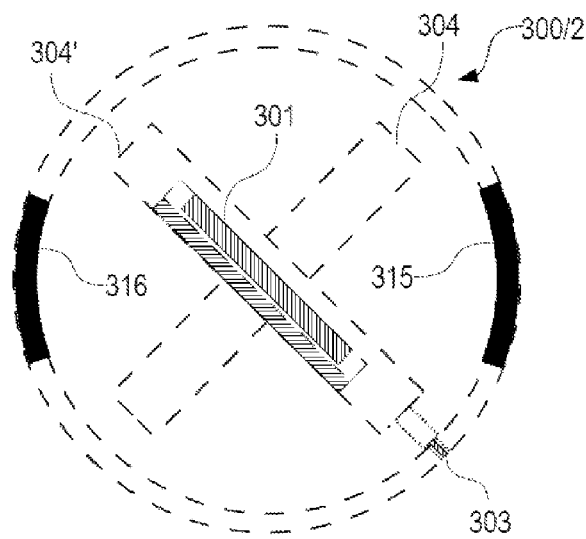

The movable part of the exemplary arrangement 300 is illustrated in FIG. 5a). It comprises the mirror 301, which can be moved about its vertical axis of symmetry 310, together with the remainder of the movable part. The shown mirror is square, its shape, however, can also be adapted to the optical path in an advantageous manner, and can be rounded at the upper (and possibly at the lower) corners, e.g. The shape can also be substantially circular. The shape, however, can also be in the style of a rectangle, e.g. when the optical imaging is carried out on a rectangular camera chip, when cylinder lenses are used or when the lenses are cut, e.g. so as to be adapted to the housing, to save weight or volume, or the like. The mirror surface should be greater than the cross section of the optical path at this location. To save space, the surface excess should not be more than 20%, preferably less than 10%, more preferably less than 5%. This mirror is fixedly connected to the shaft 302 here. The shaft 302 is supported within the housing 304 so as to be rotatable about the axis 311 and the mirror 301 can be folded in and out with it. In the position, which is folded into the optical path, the mirror is located on the stop 305 of the housing 304. The mirror is preferably held in this position by means of suitable devices, e.g. springs or magnets (not in the image), which can be disengaged by means of a suitable impact, e.g. application of a force, so that this position can be left. The shaft 302 encompasses a "nose" 303 here in the extension on one side. FIG. 5a) shows the movable part of the switch arrangement, once from the side (left), once from the front with one of the mirror surfaces facing away from the stop (top right), and once from the top (bottom right). The mirror in each case encompasses here a mirrored surface on both sides. The entire exemplary switch arrangement 300 can be seen in FIGS. 5b) and c) in the view from the top. In FIG. 5b), the movable part of the arrangement is suggested in two positions 304 and 304', which are vertical to one another. These are the positions 2 and 3, in which the optical path is deflected by 90° or −90°, respectively. The way of the "nose" 303 in response to passing through the different switch arrangements is suggested by means of the two dashed concentric circles around the movable part of the arrangement. One or two "ramps" 315 and 316, respectively, are located at at least one location, here at two locations.

Figure 5C:
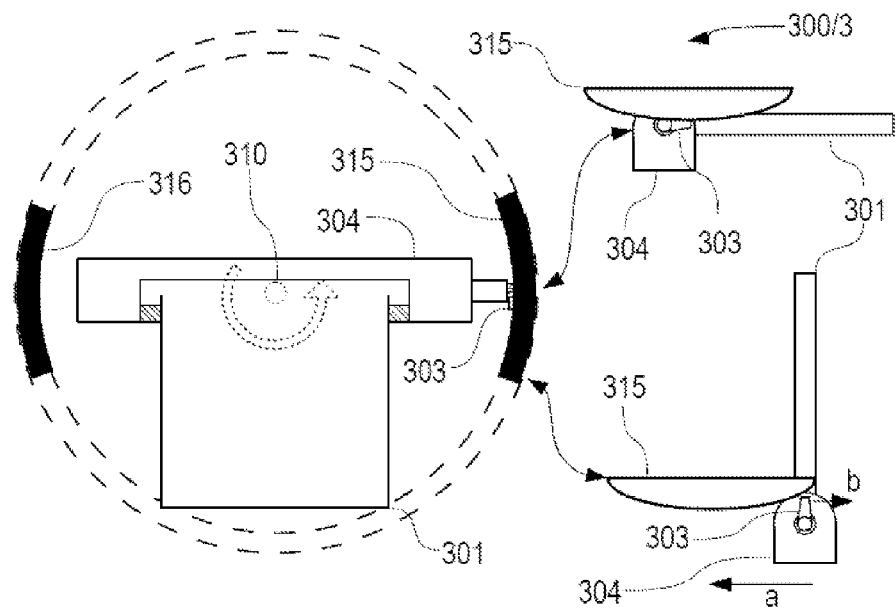

FIG. 5c) shows a further position of the movable part of the switch arrangement, first in the view from the top (left), namely in position 1 from FIG. 4a) with the mirror 301, which is folded away from the optical path: free passage. The part comprising the outermost part of the shaft 302 and the "nose" 303 is moved underneath one of the ramps 315 or 316. The "nose" 303 was thereby pushed down and the mirror 301, which is connected to the "nose" 303 via the shaft 302, was pushed down and thus out of the optical path. The auxiliary drawings on the right show the position of the "nose" 303 and of the mirror 301 as a function of the rotation of the entire movable part of the arrangement about the axis 310, thus the image on the top right, when the "nose" is located completely underneath the "ramp" and the mirror 301 is folded away completely and the image on the bottom right in the position, where the "nose" is in the process of moving underneath the "ramp".

Due to the stop 305 in the solution introduced here, it might be advantageous for the rotation about the axis 310 to only take place in one direction. The mirror 301 is preferably mirrored here from both sides, so that the magnification range is passed through twice for each 360° rotation. The ramps 315 and 316 could also be arranged underneath the shaft 302 (instead of above as in FIG. 5). In such a case, the "nose" 303 would have to face downwards and not upwards in the case of the mirror in the optical path.

As mentioned further above, this switch has three positions. For some purposes, a combination of two positions could be sufficient. They could be realized with a similar, but slightly simplified arrangement, which is in each case specified in brackets:

1. Combination of positions 1 and 2: free passage and reflection of the optical path under 90° (also possible: instead of the rotation of the mirror about the vertical axis of symmetry and folding the mirror away from a position between the +45° and −45° positions: folding over the mirror in the 45° position into and away from the optical path).
2. Combination of positions 1 and 3: free passage and reflection of the optical path under −90° (also possible: instead of the rotation of the mirror about the vertical axis of symmetry and folding away the mirror from a position between the +45° and −45° positions: folding over the mirror in the −45° into and away from the optical path).
3. Combination of positions 2 and 3: reflection of the optical path under 90° and reflection of the optical path under −90° (also possible: instead of the rotation of the mirror about the vertical axis of symmetry and folding away the mirror from a position between the +45° and −45° positions: changing between the +450 and −45° positions of the mirror by rotating the mirror about the axis 310).

The first two twofold combinations could also be realized in a very simple manner by means of the above-specified switchable mirrors without moved parts. The third combination could be realized by means of crossed switchable mirrors. In all three twofold combinations, the rotation device of the mirror about the vertical axis of symmetry as well as the "nose" and the "ramp" could be omitted. In the case of the threefold switch, the "nose" and the "ramp" could also be omitted when a control and an actuator were to fold away the mirror in the correct position.

Figure 6:
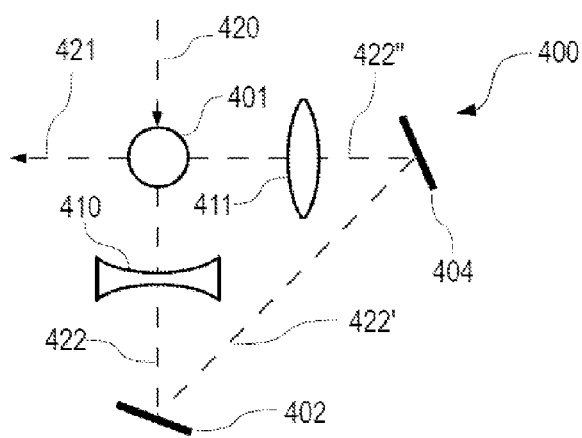

FIG. 6 shows a further alternative 400 of the magnification changer according to the invention with less space requirement than in the alternative from FIGS. 3 and 4. The optical path 420 enters into the arrangement from the top through the switch 401 and also leaves the arrangement through the same switch 401 to the left. Occasionally, it is possible for the optical path to run through the lens 410, is deflected at the mirror 402 by 45°, is further deflected at the mirror 404 by further 45°, then runs through the lens 411 so as to then finally reach the switch 401 or the light propagates exactly in the opposite direction with the optical path. The observations relating to the magnification stages are similar as in FIG. 4 and can be understood easily by the person of skill in the art.

The advantage of the arrangement introduced in FIG. 6 lies in the small space requirement. In the event that the optical path were infinitely thin, the arrangement would only be half as small as the arrangements from FIGS. 3 and 4. In the case of real optical paths, the result must be relativized and the space gained is considerably less than 50%. A possible disadvantage follows from the fact that the number of the reflections for the magnification 1 is 1 and is thus odd. The resulting image is thus mirror-inverted. The number of the reflections for the two other magnifications is two or four, respectively, and is thus even. The image is thus turned the right way. An image-reversing device, which can be swiveled in, would thus possibly have to be integrated, which would highly relativize the space gain. In response to observations with an electronic image recording device (camera chip), a software solution would thus lend itself, in which the chip would in each case be read out differently or a corresponding transformation would be carried out after the read-out, which delivers the image being turned the right way. In addition, the angles in the optical path do not need to be 90°, 45° and 45°, angles of 60° could be used three times, e.g., or also other values, depending on the task. The solution from FIG. 6 can also optionally comprise a Galileo or Kepler arrangement.

Figure 7:
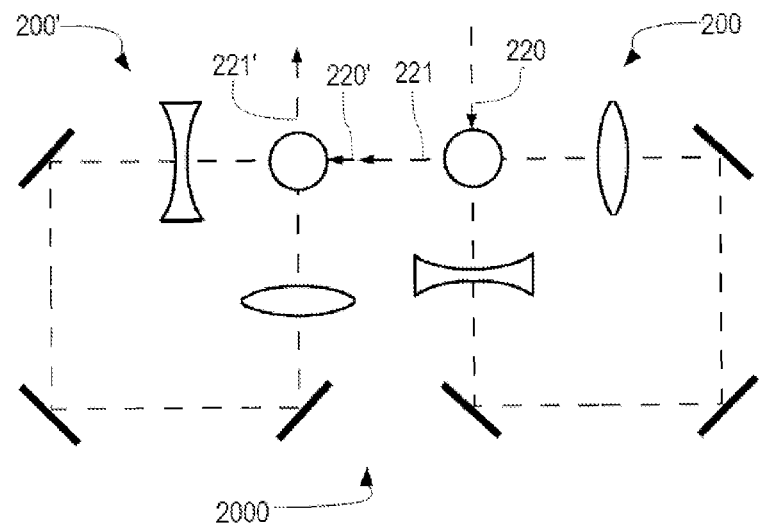
FIG. 7 shows a twofold cascade from two magnification changers according to the invention and opposite course of the optical path at the input and output of the arrangement.

FIG. 7 shows a twofold cascade 2000 from two magnification changers 200 and 200' according to the invention and with course of the optical path in the opposite direction at the input and output of the arrangement. The first stage 200 is identical with the arrangement according to FIG. 3*b*). For the second stage 200', the same arrangement was rotated by 90° and was "flange-mounted" with the input to the output of the first stage. The purpose easily follows from the comparison of the arrangement according to the invention with the state of the art according to FIG. 1 or 2. In most cases, the number of the magnification stages of the arrangement according to the invention is limited to two to three, as compared to the magnification changers according to the state of the art. By means of the cascading, four, six or nine magnification stages can be obtained with four lenses, instead of the four or five magnification stages as in the state of the art. For the case of three magnification stages for each cascade stage discussed for FIG. 4, we have three magnification stages for each cascade stage, thus also for the first one. Each of them is combined with each magnification stage of the second cascade stage and a total of nine magnification stages thus result. This signifies almost a doubling of the number of the magnification stages in response to the same number of lenses (or more general, respectively: optical elements with refractive power not equal 1) as compared to a common arrangement of a Galileo changer. A threefold cascade with a total of only six lenses (not illustrated) would offer 27 magnification stages. An additional effort of 50% of lenses/optical elements as compared to a twofold cascade would thus result in a growth of magnification stages of 440%. In the case of applications, in which the number of the magnification stages is important, the cascade solution surely represents more than only an interesting possibility. The twofold cascade from FIG. 7 always has an even number of reflections, that is, the image is always turned the right way.

Figure 8:
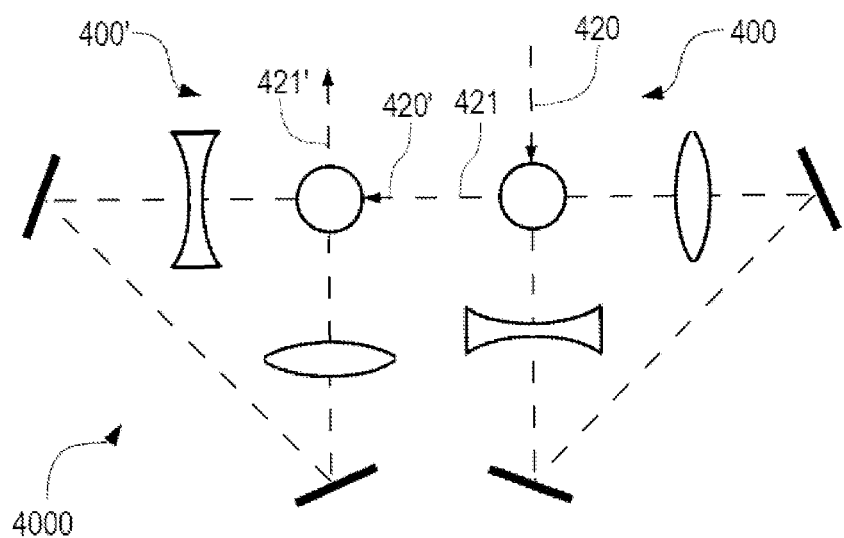
FIG. 8 shows a twofold cascade of two magnification changers according to the invention with less space requirement and course of the optical path in the opposite direction at the input and output of the arrangement.

FIG. 8 shows a twofold cascade 4000 from two magnification changers 400 and 400' according to the invention with less space requirement and course of the optical path in opposite direction at the input and output of the arrangement. As does the arrangement in FIG. 7, it encompasses up to nine magnification stages. The remarks relating to FIG. 7 apply accordingly. The first stage 400 is identical with the arrangement according to FIG. 6. For the second stage 400', the same arrangement was rotated by 90° and was "flange-mounted" with the input to the output of the first stage.

Figure 9:
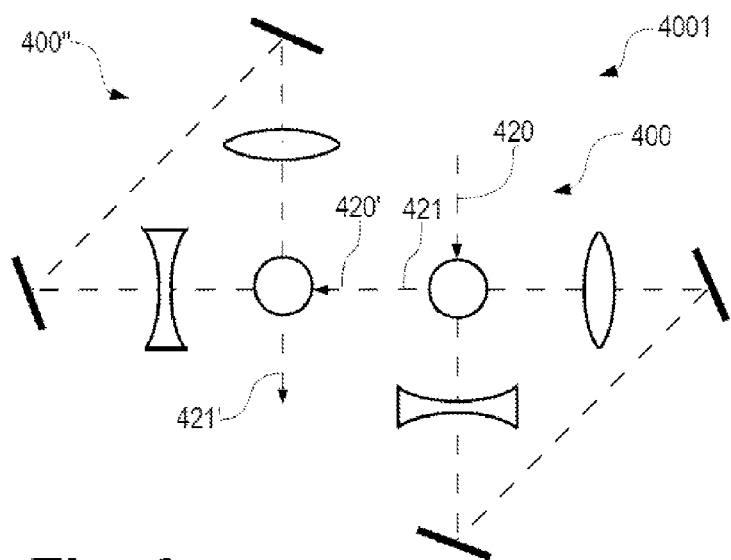
FIG. 9 shows a twofold cascade of two magnification changers according to the invention with less space requirement and course of the optical path in the same direction at the input and output of the arrangement.

FIG. 9 shows a twofold cascade 4001 from two magnification changers 400 and 400" according to the invention with less space requirement and course of the optical path in the same direction at the input and output of the arrangement. As do the arrangements in FIGS. 7 and 8, it encompasses up to nine magnification stages. However, in two of nine cases, the number of the reflections is odd, with the already discussed consequences. The remarks relating to FIG. 7 apply accordingly. The first stage is identical with the arrangement according to FIG. 6. For the second stage, the same arrangement was rotated by 90°, was mirrored about the input axis and was "flange-mounted" with the input to the output of the first stage.

Figure 10:
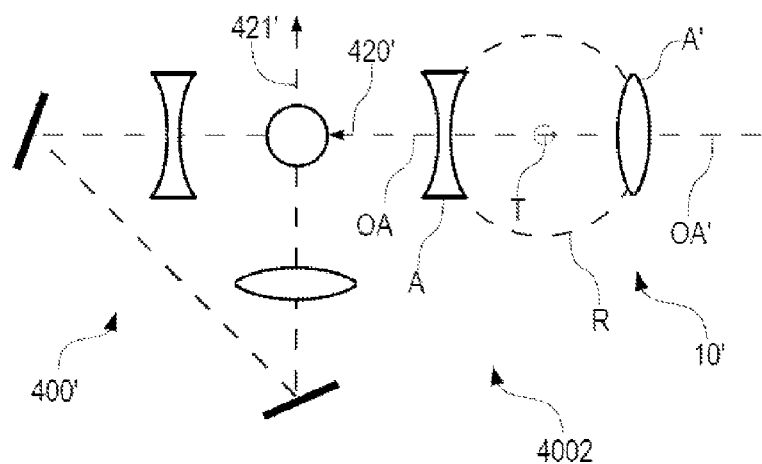
FIG. 10 shows a twofold cascade of a magnification changer according to the invention with less space requirement and common threefold Galileo changer.

FIG. 10 shows a twofold cascade 4002 from a magnification changer 401' according to the invention with less space requirement according to FIG. 6 and a common threefold Galileo changer 10'. As the arrangements in FIGS. 7, 8 and 9, it encompasses up to nine magnification stages. The remarks relating to FIG. 7 apply accordingly. The first stage (Galileo changer) is similar to the arrangement according to FIG. 1, but comprises only two lenses instead of four. For the second stage, the same arrangement according to FIG. 6 was rotated by 90° and was "flange-molded" with the input to the output of the first stage. The small dimensions of the first stage are advantageous, the larger moved masses and unfavorable mass distribution, which could influence the time constant of the switching process, are disadvantageous.

Figure 11:
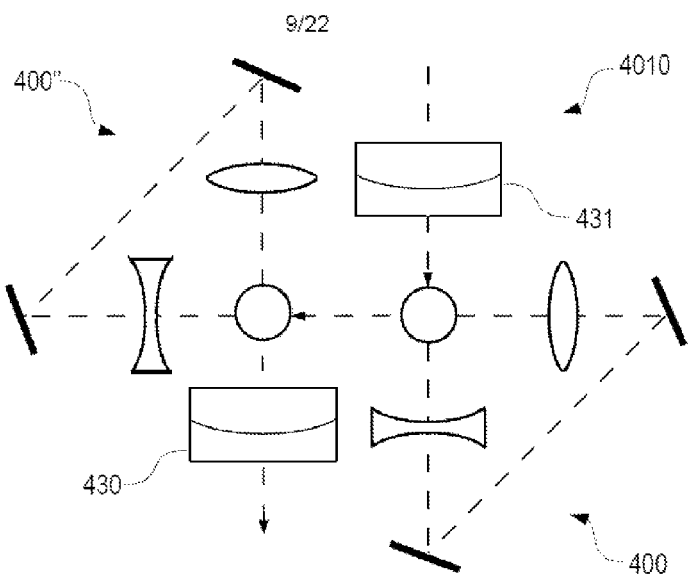
FIG. 11 shows a twofold cascade of two magnification changers according to the invention with less space requirement and course of the optical path in the same direction at the input and output of the arrangement, broadened with zoom with lenses having a variable refractive power.

FIG. 11 shows a twofold cascade 4010 from two magnification changers 400 and 400" according to the invention with less space requirement and course of the optical path in the same direction at the input and output of the arrangement, supplemented by a zoom with lenses having a variable refractive power, preferably for making the changer (quasi) continuous (see further below). It goes without saying that the lenses having a variable refractive power can also be positioned at other locations in the arrangement. However, they must then possibly be controlled differently. In the case of the design, one preferably assumes that, in the case of a large distance between the lenses having a variable refractive power, they must be controlled to a lesser extent, which has a favorable impact on the optical errors. This would suggest positioning these lenses at the input and at the output of the arrangement. An arrangement of the lenses having a variable refractive power at the input and output of a stage of the cascade, in particular the one having a small magnification step, would be possible. The zoom with lenses having a variable refractive power (see, e.g.: U.S. Pat. No. 7,411,739 B2 and US 2009/0021843 A1, the content of which is adopted in its entirety by reference) currently has a good optical quality only within a relatively small dynamic range. Its purpose is here to change the discrete magnification changer into a quasi-continuous magnification changer, in that the "holes" between the discrete magnification stages are filled with the continuous zoom. The dynamic range of the zoom with lenses having a variable refractive power can be supplemented by using double lenses having a variable refractive power (see, e.g.: U.S. Pat. No. 7,411,739 B2 and US 2009/0021843 A1) or by further pairs of lenses having a variable refractive power, because the correction of the optical errors is improved considerably through this. The "holes" between the discrete magnification stages could also be filled with a common zoom, which would only have to be relatively short due to the only small required dynamic. The common zoom could thereby be arranged as a coherent unit (also possible for zoom with lenses having a variable refractive power) on one side of the cascade or between the two cascade stages, but it could also brace the entire cascade as well as individual cascade stages, wherein it is also possible that parts of the cascade (e.g. individual lenses) could be involved in the zoom process, either as stationary or as movable part. Due to the fact that the traveled path would be small, the movability of the zoom parts could be achieved by means of piezo drive, e.g. It goes without saying that a continuous zoom can also be combined only with a discrete magnification changer, in particular one of the arrangements according to the invention.

Due to their speed, the lenses having a variable refractive power could also be used for autofocus and optical image stabilization (anti jitter), but also for residual correction of the optical errors of the arrangement or of the optics comprising the arrangement. Further observations relating to this topic can be found in U.S. Pat. No. 7,411,739 B2, US 2009/0021843 A1 and DE 10 2007 039 851 A1. Lenses having a variable refractive power can be delivered by Varioptic (France), Holochip (USA) and Optotune (Switzerland).

Figure 12:
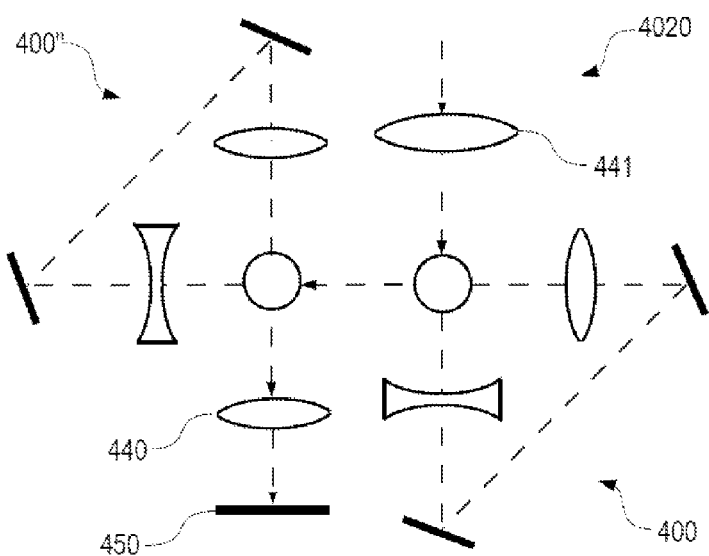
FIG. 12 shows a twofold cascade of two magnification changers according to the invention with less space requirement and course of the optical path in the same direction at the input and output of the arrangement in a camera arrangement.

FIG. 12 shows a twofold cascade 4020 from two magnification changers according to the invention with less space requirement and course of the optical path in the same direction at the input and output of the arrangement in an exemplary camera arrangement. The lens 441 was positioned in front of the input of the arrangement and the image lens 440 and the camera chip 450 were positioned at the output.

All of the cascades 7-12 were shown in one plane, so as to be particularly clear. The cascade parts, however, could indeed leave the one plane, e.g. the first stage could be rotated against the second stage by 90° (or another angle), so that one stage stands vertical, e.g. on the plane of the other stage.

Figure 13A:
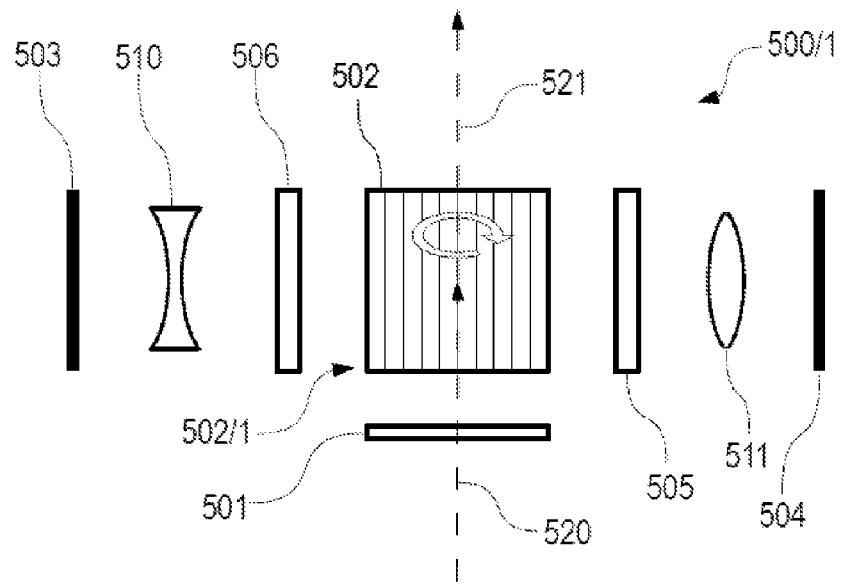
FIG. 13 shows a magnification changer according to the invention with optical arrangement at right angles to the remaining optical path; first alternative.
   a) polarization cube as switch switched to passage
   b) polarization cube as switch switched to 90° deflection
   c) polarization cube as switch witched to −90° deflection.
Figure 13B:
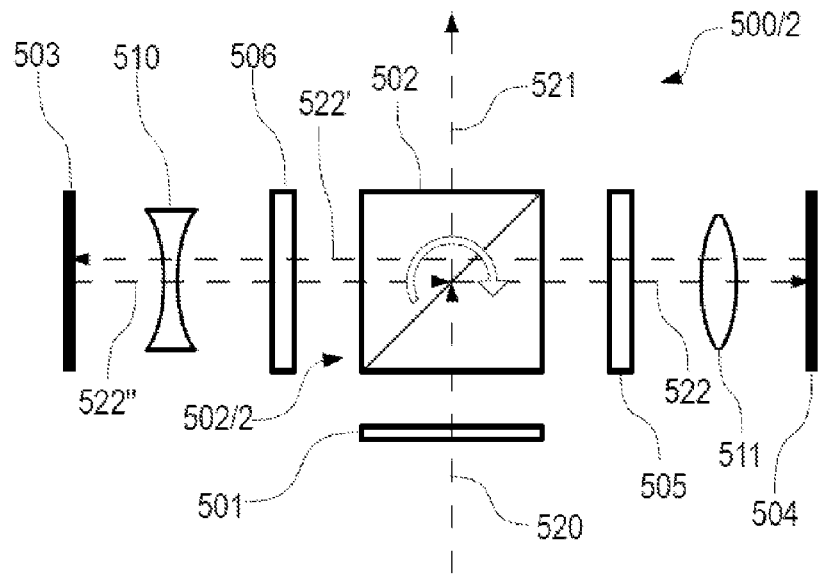

FIG. 13 shows a first alternative 500 of a magnification changer according to the invention at right angles to the remaining adjacent optical path in the three different magnification stages. In FIG. 13a), the preferably afocal non-polarized input ray beam 520 first passes the polarizer 501, which only allows for a first polarization P1 to pass, and impacts the polarization cube 502. In its positions/1 illustrated herein, the polarization cube 502 also allows only for light of the polarization P1 to pass. The light passes through the polarization cube 502 and leaves the arrangement P1, polarized as a preferably afocal output ray beam 521. The magnification of the arrangement at this position is 1, the polarization at the output is P1. The arrow indicates, how the polarization cube must be rotated, so as to reach the position of the arrangement 500 shown in FIG. 13b).

In FIG. 13b), the preferably afocal non-polarized input ray beam 520 first passes the polarizer 501 again, which only allows for a first polarization P1 to pass, and impacts the polarization cube 502. The polarization cube 502 in its position/2 illustrated herein, however, only allows for light of the polarization P2, which is vertical to P1, to pass, the polarization P2, however, has already been filtered out at the polarizer P and is no longer present. The P1-polarized light is reflected laterally to the right, passes a polarization rotator 505 as ray beam 522, the lens 511, is reflected back by the mirror 504 and passes the lens 511 and the polarization rotator 505 as ray beam 522' and reaches the polarization cube 502 with polarization P2, which is rotated by 90°, so that it can pass the polarization cube. It further passes the polarization rotator 506 as ray beam 522", then the lens 510, is subsequently reflected back by the mirror 506, passes the lens 510 as ray beam 522", then the polarization rotator 506 and reaches the polarization cube 502 rotated by further 90° in the polarization. The further polarization rotation had the effect that the polarization is now P1 again. The ray beam is reflected and leaves the arrangement as output ray beam 521. The lenses 510 and 511 were thereby preferably chosen such that the output ray beam 521 is afocal again, even if the diameter of the output ray beam is different than that of the input ray beam 520. The magnification of the arrangement in this position is a, the polarization is P1. The polarization rotators 505 and 506 can be obtained from the Swiss company Optotune, e.g. The arrow indicates, how the polarization cube must be rotated, so as to reach the position shown in FIG. 13c).

Figure 13C:
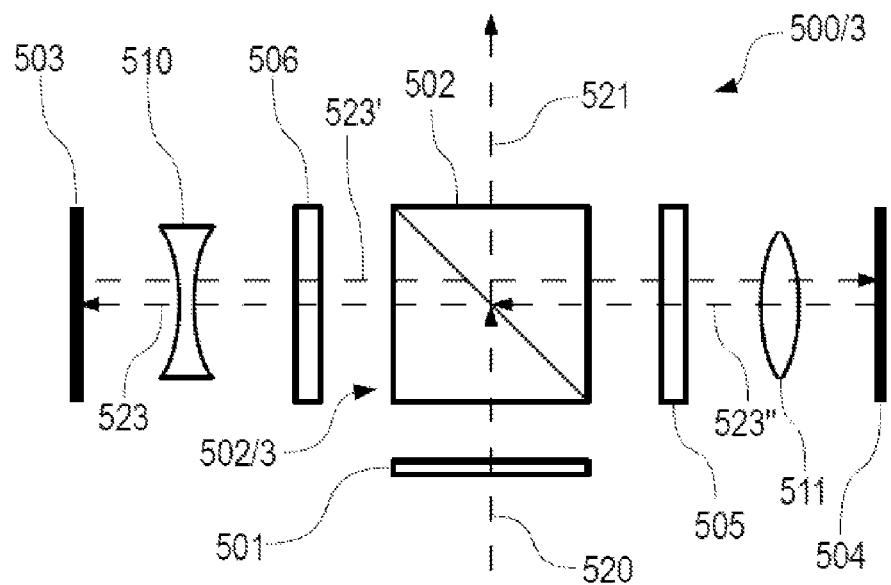

In FIG. 13c), the preferably afocal non-polarized input ray beam 520 first passes the polarizer 501 again, which only allows for a first polarization P1 to pass, and impacts the polarization cube 502. The polarization cube 502 in its position/3 illustrated herein, however, only allows for light of the polarization P2, which is vertical to P1, to pass, the polarization P2, however, has already been filtered out at the polarizer P and is no longer present. The P1-polarized light is reflected laterally to the left, passes a polarization rotator 506 as ray beam 523, the lens 510, is reflected back by the mirror 503 and passes the lens 510 and the polarization rotator 506 as ray beam 523' and reaches the polarization cube 502 with polarization P2, which is rotated by 90°, so that it can pass the polarization cube. It further passes the polarization rotator 505 as ray beam 523", then the lens 511, is subsequently reflected back by the mirror 504, passes the lens 511 as ray beam 523'", then the polarization rotator 505 and reaches the polarization cube 502 rotated by further 90° in the polarization. The further polarization rotation had the effect that the polarization is now P1 again and that the ray beam is reflected and leaves the arrangement as output ray beam 521. The lenses 510 and 511 are still the same as in FIG. 13b) and were thereby preferably chosen such that the output ray beam 521 is afocal again, even if the diameter of the output ray beam is different than that of the input ray beam 520. The magnification of the arrangement in this position is 1/a, the polarization is P1 at the output. The polarization rotators are chosen such that the sum of the polarization rotations in the left or in the right "arm" of the arrangement, respectively, is in each case exactly 90° when passing through twice. Due to the fact that all of the surfaces are more or less polarization-rotating, one must assume that half of the polarization rotation are combined in the polarization rotator and is 45° when passing forward and backwards through an "arm" of the arrangement. The actual polarization rotation ability of the polarization rotator can deviate considerably from this. The arrow indicates, how the polarization cube must be rotated, so as to reach into the position shown in FIG. 13a) again. The arrangement introduces a new family of magnification changers in an exemplary manner. The person of skill in the art can develop further alternatives without any problem.

The polarization cube 502 also serves as optical switch here and corresponds to the switch 201, e.g., from FIG. 4. By rotating the cube about the optical axis by 90°, a switch is made from the position in FIG. 13a) into the position in FIG. 13b) or by rotating the cube about an axis vertical to the plane, spanned by the optical path by 90°, a switch is made from the position in FIG. 13b) into the position in FIG. 13c) or by rotating the cube about the optical axis by 90°, a switch is made from the position in FIG. 13c) into the position in FIG. 13a).

Exemplary alternatives would be rotation of the polarizer 501 about the optical axis by 90° from the position in FIG. 13c) or FIG. 13b) so as to obtain magnification 1. The polarization at the output would then be P2. It could be converted into P1 with the help of a polarization rotator, which can be swiveled in or which is variable. In these alternatives, the polarization cube would not be the only full switch, but only a partial switch. The second partial switch would be the polarizer 501. These alternatives preferably work with non-polarized light at the input of the arrangement.

Figure 14:
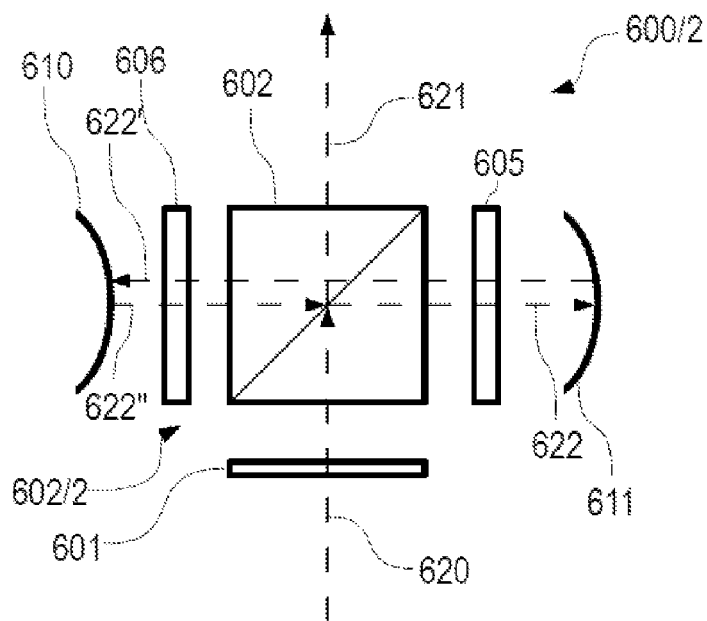
FIG. 14 shows a magnification changer according to the invention with optical arrangement at right angles to the remaining optical path: second alternative.

FIG. 14 shows the magnification changer 600 according to the invention at right angles to the remaining adjacent optical path and polarization cube in position/2 in a second alternative. In this alternative, the functions of the lenses 510 or 511, respectively, and of the flat mirrors 503 or 504, respectively, were taken over by non-flat mirrors 610 or 611, respectively. The mirrors can assume shapes of a paraboloid, hyperboloid, of a sphere or other rotationally symmetrical shapes, with axis of rotation preferably coinciding or parallel to the optical axis of the optical path. For special or further objects, the mirrors, however, can also assume other shapes, they can be cylindrical, e.g., with cylinder axis of rotation vertical to the optical axis of the optical path. The polarization rotators 605 and 606 have the same function as in FIG. 13. They could also form a polarization-rotating layer on the mirrors 610 or 611, respectively, or the characteristics of the mirror surface itself is chosen such that it has the required characteristic with reference to the polarization rotation. The positioning of the polarization rotators in the lateral arm of the optical path can be chosen relatively freely, they must effect a polarization rotation with all of the other polarization-rotating optical elements and surfaces, which effect a change from a polarization, which is to be reflected, to a polarization, which is to be allowed to pass, and vice versa. The use of the non-flat mirrors saves space, weight and costs and can additionally have a positive impact on the image quality and intensity, which is allowed to pass. The mirrors are not only impacted under an angle of the optical path, the imaging errors, such as coma and astigmatism, which are caused by this and which are difficult to control, thus do not appear. The large advantage as compared to lenses is the lack of the chromatic aberrations. Large magnification stages can also be realized in a simpler manner.

The arrangement in FIG. 14 could be reduced even further in that the mirrors would be integrated directly into the walls of the polarization cube, wherein a suitable polarization rotation, however, would have to take place in front of or at the mirror surface.

The telescope arrangement of two mirrors of FIG. 14 could also be replaced with a combination of one lens and one mirror. Using other telescope arrangements with mirrors, lenses and DOEs (diffractive optical elements) is possible such as the telescope arrangement according to Newton, Nasmyth, Herschel, Cassegrain, Gregory, Schmidt, Schmidt-Cassegrain, Schwarzschild, Couder, Maksutov, Lurie-Houghton, Klevtsov, Kutter, Yolo, Mersenne-Schmidt, Ritchey-Chretien-Cassegrain, Dall-Kirkham-Cassegrain, etc. The coupling in via polarization cubes would also not be absolutely necessary. The coupling via a flat mirror, which is common in the case of mirror telescopes, could also be used, in the event that it would be possible to accept the occurring intensity loss. All of the arrangements mentioned here could be used as Galileo embodiment (no intermediate image), as well as as Kepler embodiment (with intermediate image). It goes without saying that all of them can also be cascaded and can be supplemented by zooms having a small dynamic, see also comments relating to FIG. 11.

Figure 15:
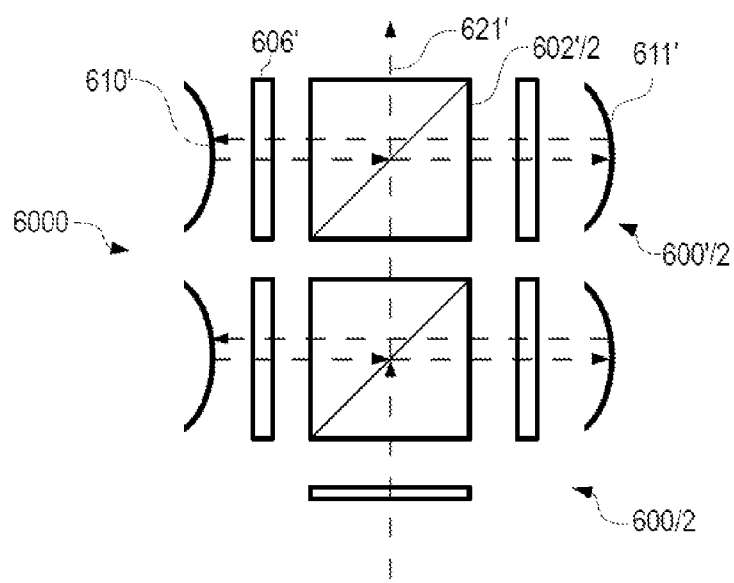
FIG. 15 shows a twofold cascade of two magnification changers according to the invention at right angles to the optical path.

FIG. 15 shows a twofold cascade 6000 of two magnification changers 600/2 and 600'/2 according to the invention at right angles to the optical path according to FIG. 14. One of the polarizers at the input to the second stage of the cascade was thereby omitted. The second polarizer is not necessary, because the polarization at the output of the first stage is clear and constant. The number of the magnification stages can be four, six or nine, similarly as in the arrangements according to FIGS. 7-10, because both cascade stages can in each case contribute a factor 2 or 3 to the number of the magnification stages.

On the other hand, one stage could supply discrete magnification values and could be switchable, the other stage would not need to be switchable, but could use mirrors having a variable refractive power, so as to supply a quasi-continuous magnification changer as a whole.

Using cylindrical mirrors, the arrangement would not work as cascade, but each stage would magnify another coordinate. For this purpose, cylindrical mirrors, which act on different coordinates, would have to be arranged in the two stages. The image would thus need to be changed accordingly with reference to the mirrors.

Figure 16:
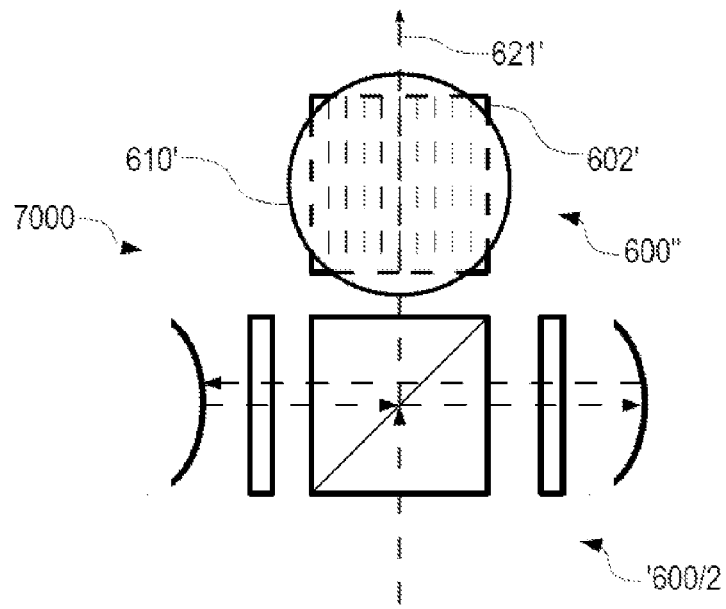
FIG. 16 shows a magnification changer according to the invention with optical arrangement at right angles to the remaining optical path: third alternative for non-polarized light.

The arrangement 7000 from FIG. 16 again comprises two arrangements 600/2 and 600" according to FIG. 14 by omitting the polarizer and wherein the second arrangement is rotated by 90° as compared to the first arrangement. The arrangement according to FIG. 16, however, is not a cascade, but allows the operation as Galileo changer with non-polarized light. However, only two magnification stages are possible in the arrangement, which is illustrated in this manner: a and 1/a.

For the magnification a, the polarization cube 602 is brought into position/2 and the polarization cube 602" is brought into position/1. Light having a polarization P1 is deflected at the polarization cube 602/2, but light having the polarization P2 is allowed to pass. The light portion having polarization P1 experiences a magnification a, the light portion having polarization P2 experiences a magnification 1. Both light portions of the initial polarization P1 and P2 leave 600/2 in the original polarization state. The polarization P1 is now allowed to pass at the polarization cube 602" and P2 is deflected. The light portion having polarization P1 experiences a magnification 1, the light portion having polarization P2 experiences a magnification a. The total magnification of the light portion having the polarization P1 is thus a×1=a and the total magnification of the light portion having the polarization P2 is thus 1×a=a, the total magnification after passing through the arrangement 7000 is thus a for both polarizations.

For the magnification 1/a, the polarization cube 602 is brought into position/3 and the polarization cube 602" is brought into position/4, which is rotated by 180° to position/1 about the optical axis 621. Light having polarization P1 is deflected at the polarization cube 602/3, whereas light having polarization P2 is allowed to pass. The light portion having polarization P1 experiences a magnification 1/a, the light portion having polarization P2 experiences a magnification 1. Both light portions of the initial polarization P1 and P2 leave 600/3 in the original polarization state. Polarization P1 is now allowed to pass at the polarization cube 602" and P2 is deflected. The light portion having polarization P1 experiences a magnification 1, the light portion having polarization P2 experiences a magnification 1/a. The total magnification of the light portion having polarization P1 is thus (1/a)×1=1/a and the total magnification of the light portion having polarization P2 is thus 1×(1/a)=1/a, the total magnification after passing through the arrangement 7000 is thus 1/a for both polarizations.

The magnification 1 is eliminated. A magnification of 1 could be realized with a swivelable or variable or switchable polarization rotator, respectively, by 90° between the stages or with a stage 600'', which can be rotated about the optical axis 621' or with a further pair of identical mirrors in the second stage, vertically to the ones already shown and parallel to those of the first stage, as the person of skill in the art can identify easily. The one polarization is thereby preferably allowed to pass through both stages unhindered and the other one is magnified first with a and then with 1/a or vice versa.

Figure 17:
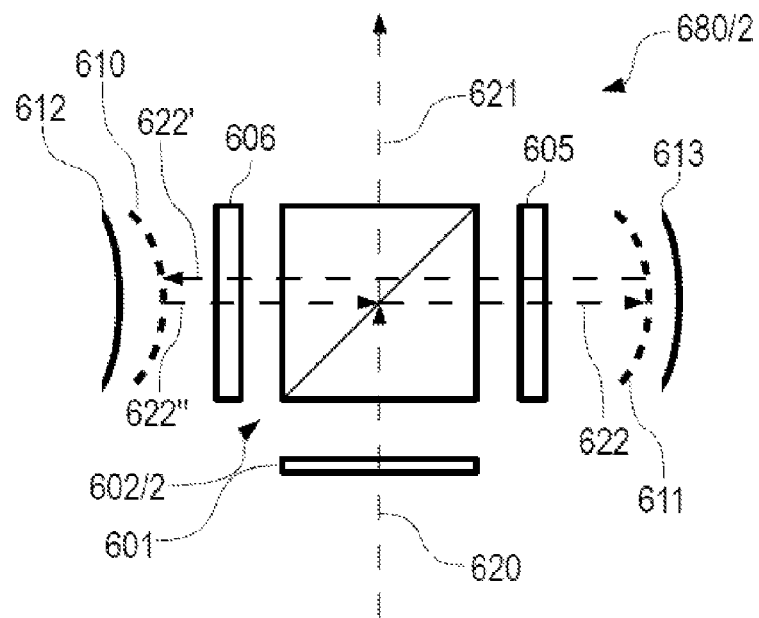
FIG. 17 shows a magnification changer according to the invention with optical arrangement at right angles to the remaining optical path: second alternative broadened by switchable mirrors.

The arrangement 680 in FIG. 17 is also a possible alternative and a further development of the arrangement from FIG. 14 and can be seen to be an alternative for the arrangement from FIG. 15. The elements of the arrangement in FIG. 17 correspond to those from FIG. 14, with the exception that the mirrors 610 and 611 are now switchable mirrors having a refractive power and the arrangement was furthermore supplemented by the (preferably non-switchable) mirrors having a refractive power 612 and 613. The optical axes of the mirrors 612 and 613 coincide with the axes of the mirrors 610 and 611. The arrangement works with mirrors 610 and 611, which are switched to reflection, in the same manner as the arrangement according to FIG. 14. Here, the magnification shall be a with the polarization cube 602 in the position/2. The magnification could be 1/a or 1, respectively, depending on the switching state of the optical switch, here of the polarization cube 602, in positions/3 or /1, respectively. In the event that the mirrors 610 and 611 are switched to transmission, the beams 622 and 622' pass the now transparent mirrors 610 and 611 unhindered and are only reflected at the mirrors 612 and 613. The magnification is now b with the polarization cube 602 in the position/2. The magnification could be 1/b or 1, respectively, depending on the switching state of the optical switch, here of the polarization cube 602 in positions/3 or /1, respectively. The arrangement thus has five magnification stages. The number of the magnification stages could in each case be increased further by two for each mirror pair by means of further switchable mirror pairs. It goes without saying that the lenses of a telescope arrangement could also be embodied so as to be at least partially switchable and the number thereof could preferably be increased in pairs. In the event, however, that the mirror focal lengths are chosen skillfully and the mirrors themselves are positioned skillfully, each mirror can be combined one the one side with each mirror on the other side of the polarization cube. In this case, the arrangement has 9 magnification stages. In addition, the mirrors could also be added individually (not only in pairs) in this manner.

A cascade comprising two arrangements according to FIG. 17 (possibly by omitting a polarizer) would have 25 magnification stages, e.g., if each cascade stage had 5 magnification stages and would have 81 magnification stages, if each cascade stage had 9 magnification stages. A cascade comprising three arrangements (threefold cascade) would have 125 or 729 magnification stages, respectively. In the case of 4 magnification stages for each cascade stage, 16 magnification stages would be present in the case of a twofold cascade; 64 magnification stages would be present in the case of a threefold cascade. Combinations with other changers, e.g. with 2 or 3 magnification stages, are also possible. On principle, each combination of magnification changers with 2, 3, 4, 5 or more magnification stages is possible with each magnification changer also with 2, 3, 4, 5 or more magnification stages. Likewise, not only twofold and threefold cascades are possible, but fourfold, fivefold and "multiple" cascades.

Figure 18:
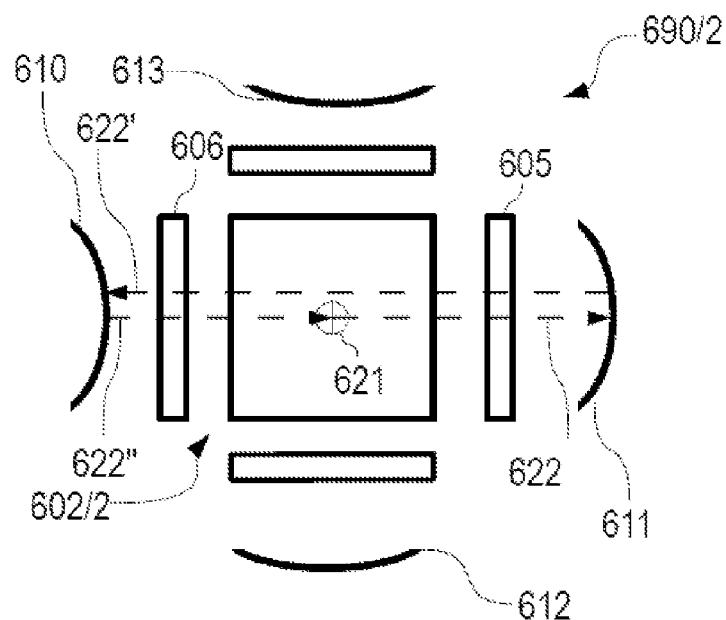
FIG. 18 shows a magnification changer according to the invention with optical arrangement at right angles to the remaining optical path: second alternative broadened by further mirrors.

The arrangement 690 in FIG. 18 comprises the same elements as FIG. 14, supplemented by an additional pair of mirrors 612 and 613, also arranged in the plane vertically to the optical path 621, but with the axes under an angle, here an angle 90° for example, to the optical axes of mirrors 610 and 611. This time, the illustration in FIG. 18 is opposite to the optical path direction, thus vertically to that in the illustration from FIG. 14. It provides a possibility for the relative movement/rotation of the mirrors about the polarization cube and the axis of the optical path. Either the polarization cube comprising polarizer or the mirror can be rotated. Through this, the different mirror pairs can take effect consecutively. Further mirror pairs could also be arranged about the optical path axis. The number of the magnification stages according to FIG. 18 is five. Two additional magnification stages are added with each further mirror pair. This arrangement can also be cascaded.

Similarly as other discrete magnification changers, all of the arrangements from FIGS. 13-18 can be supplemented by a continuous zoom having a small dynamic range, which preferably closes at least the magnification gaps between the discrete stages. It can thereby be a digital zoom, a zoom with lenses having a variable refractive power or even a common zoom, wherein parts of the arrangements according to FIGS. 13-18 can act as stationary or slightly moved zoom parts.

Even if the examples from FIGS. 13-18 refer to the Galileo arrangement (no intermediate image), it goes without saying that it is also possible to use the Kepler arrangement. The optical elements having a negative refractive power would only need to be replaced with suitable elements having a positive refractive power.

The different alternatives of the discrete magnification stages and quasi-continuous magnification ranges of the discrete magnification changers, possibly supplemented by a continuous zoom, are illustrated in FIGS. 19 and 20.

FIG. 19 deals with magnification stages and ranges for a one-stage threefold magnification changer with the three discrete magnification stages a, 1 and 1/a. In FIG. 19a), the case of a changer with only discrete magnification stages was illustrated. The three magnification stages can be identified, illustrated by horizontal beams, as well as the total magnification dynamic, which is suggested by the hatched vertical beam, from which, however, only the three discrete values can be discussed. The total magnification dynamic is $a^2$ for a Galileo or Kepler telescope with magnification a. Such changers are realized by arrangements according to the invention according to FIGS. 3, 6, 13 and 14, and according to FIGS. 23, 24, 25, 28, 29, 30, 31, 32, which follow below, as well as by arrangements from the state of the art, e.g. according to FIGS. 1 and 2.

In FIG. 19b), the case of a one-stage threefold magnification changer with the three discrete magnification stages a, 1 and 1/a is present, supplemented by a continuous, optical zoom having a small dynamic range. This zoom could be a common zoom, the lens distances of the zoom and thus its total dimensions could be kept small due to the small dynamic range. The total magnification changer arrangement, however, would be less compact. Preferably, one will thus fall back to a zoom with lenses having a variable refractive power, similarly as described in context with FIG. 11. The zoom range of a zoom with lenses having a variable refractive power will preferably extend on both sides of the discrete stages, in some cases also symmetrically about the discrete stages. This situation is illustrated by the roughly hatched areas around the discrete magnification stages. Due to the fact that the zoom preferably fills at least the total space between the discrete magnification stages, the dynamic range increases, suggested by the hatched vertical beam, to at least $a^3$, because the zoom will for the most part be slightly larger than the magnification stage.

FIG. 19c) is the case of a one-stage threefold magnification changer with the three discrete magnification stages a, 1 and 1/a, supplemented by a digital zoom having a small dynamic range. The digital zoom preferably extends from a discrete magnification stage to the higher magnifications. This fact is suggested by the finely hatched areas. Due to the fact that the digital zoom also preferably fills the entire space between the discrete magnification stages, the dynamic range increases, suggested by the hatched vertical beam, also to at least $a^3$, because the zoom will for the most part also be dimensioned to be slightly larger than the magnification stage here. It must be noted that 0<a<1 applies in this illustration.

In FIG. 19d), the magnification stages and ranges of a discrete magnification changer are shown, supplemented by two zoom devices, e.g. a zoom with lenses having a variable refractive power and a digital zoom. In the event that digital zoom and zoom with lenses having a variable refractive power have the same or a similar dynamic range ≥a, the discrete magnification stage is preferably dimensioned with $a^2$ (product of both dynamic values). The total dynamic of the arrangement is then ≥$a^6$.

FIG. 20 illustrates the magnification stages and ranges for a twofold cascade from two threefold magnification changers. FIG. 20a) thereby deals with the cascaded discrete magnification changer alone. In the event that the magnification stage of the one changer is b, the magnification stage of the second changer is preferably a=$b^3$, so as to maintain equidistance of the magnification stages of the twofold cascade. As does the illustration in FIGS. 19 and 20, the equidistance thus refers to logarithmic scale. With the magnification stage of the second changer a=$b^3$, the total magnification dynamic is $a^2b^2=b^8$ and with b=1.3, e.g., the total magnification dynamic is 8.2.

Accordingly, the discrete magnification changer, supplemented by an optical zoom, e.g. with lenses having a variable refractive power or a digital zoom from FIG. 20b) has a dynamic of $b^9$, thus with b=1.3 a dynamic of 10.6. The illustration of the magnification ranges as in FIGS. 19b)-d) was forgone. The total dynamic was again suggested by a corresponding vertically hatched beam. The combination with digital zoom and optical zoom, e.g. with lenses having a variable refractive power, would have a dynamic of $b^{18}$.

In FIG. 21, the size of the optical elements of the arrangement according to FIG. 3b) was adapted to the size of the optical path and the elements themselves were further pushed against one another. A considerable reduction of the arrangement can thus be attained. The optical elements are equal to or slightly larger than the optical path. The switching mirror 101b', the lens 111b' and the first mirror 104b' are thus largest, the mirror 103b' is smaller and the mirror 102b' is even smaller, the rear side of 101b' could be mirrored on a smaller area, in the event that the mirror does not rotate by 360°. In the case of the position of the negative lens 110b', it must be noted whether and how the mirror of the switch is movable. The negative lens 110' would possibly have to be displaced further downwards, e.g. when the mirror is to rotate by a full 360°. In the event, however, that the mirror only switches between the +45° and −45° positions, without fully rotating by 360° or in the event that the mirror is only switched between reflection and transmission, the arrangement from FIG. 21 can be taken over completely.

Figure 22A:
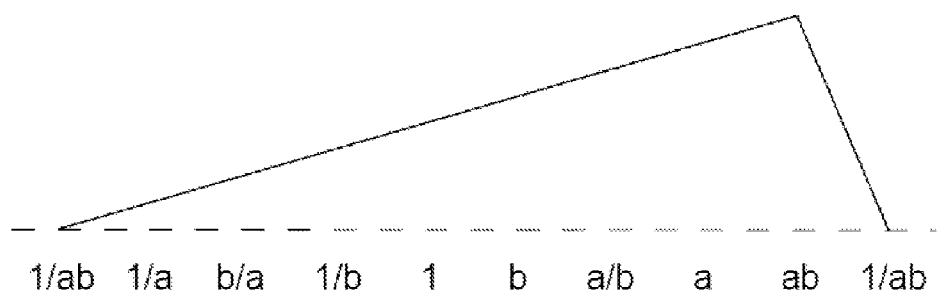
Figure 22B:
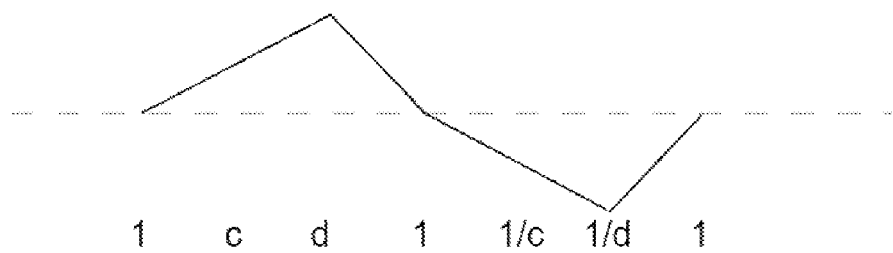

FIG. 22 compares the course of the magnification change in a twofold cascade from threefold magnification changers, e.g. according to FIG. 7, 8, 9, 10 or 15 (FIG. 22a)) to the course of the magnification change in a common fivefold Galileo changer, e.g. according to FIG. 1 (FIG. 22b)). For a=$b^3$, the magnification change for the cascade runs evenly across the entire magnification range (the magnification stages, which are discrete per se, have in each case only been suggested below). This behavior corresponds to the behavior desired by the user and is intuitive and ergonomic. 1/ab=$b^{-4}$, 1/a=$b^{-3}$, b/a=$b^{-2}$, 1/b=$b^{-1}$, 1=$b^0$, b=$b^1$, a/b=$b^2$, a=$b^3$ and ab=$b^4$ thereby applies in the drawing. Contrary thereto, the magnification of the fivefold Galileo changer runs completely uneven in response to the rotation of the arrangement. The magnification increase from the value 1 via c to d, then drops back to 1 again and then decreases further via 1/c to 1/d, however with a lower increase. The operation of the fivefold Galileo changer is not intuitive and is not ergonomic. The illustration in FIG. 22 is semi-logarithmic, wherein the magnification values themselves were added logarithmically on the ordinate, the identifier for the magnification stages were added equidistant on the abscissa. The course of the magnification change in a twofold cascade of threefold magnification changers illustrated in FIG. 22a) would even correspond to that of a twofold cascade of common threefold magnification changers, provided that the changer having smaller magnification stages is switched further twice in each case in response to the switching of the changer having larger magnification stages.

Figure 23A:
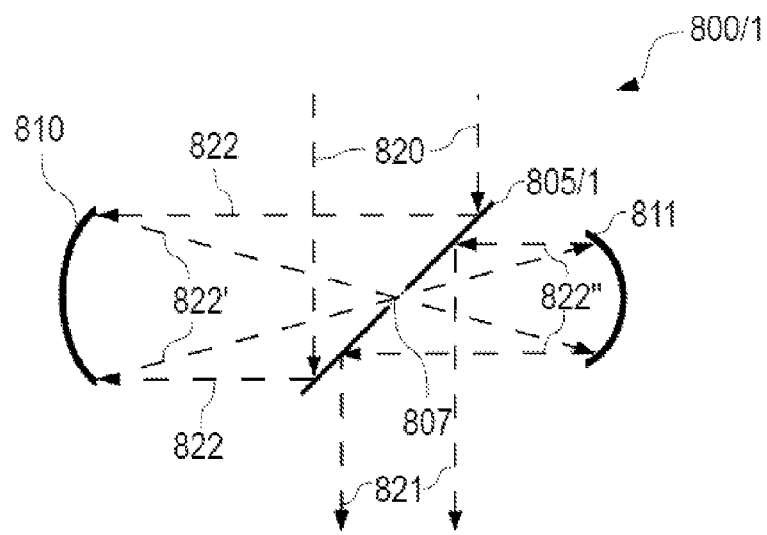

FIG. 23 shows a further alternative of the magnification changer according to the invention comprising optical arrangement at right angles to the remaining optical path. It is a Kepler magnification changer, realized with mirrors as reflective optical elements having a refractive power. The arrangement 800 is similar to 600 from FIG. 14, but both mirrors in FIG. 23 having refractive power 810 and 811 encompass a positive refractive power (Kepler arrangement), instead of once having a positive and once having a negative refractive power as in FIG. 14 (Galileo arrangement). In addition, the coupling in of the input beam in FIG. 23a) and the coupling between the two mirrors having a refractive power 810 and 811 preferably takes place by means of a substantially flat mirror 805, which is mirrored from both sides, in position/1 here, comprising a borehole or passage opening 807, which can indeed also consist of glass or of a transparent or at least partially transparent material. The passage opening 807 is preferably located substantially in the center of the flat mirror, in particular when the optical axes of the mirrors having refractive power 810 and 811 also substantially run through the center of the mirror 805.

The preferably afocal input rays 820 impact the coupling mirror 805 (swiveled in or turned on), which is preferably at a 45° angle in position 1 (805/1), are preferably deflected at an angle of 90° as optical path 822 and impact the mirror having refractive power 810. Here, the rays are reflected back as optical path 822' and are focused in or in the vicinity of the passage opening 807, wherein the passage opening 807 is passed, so as to then further impact the mirror 811. The rays are hereby preferably reflected back as afocal optical path 822' and are deflected by 90° at the mirror 805 and leave the arrangement 800, as preferably afocal optical path 821. In this position of the mirror 805, the magnification of the arrangement has the magnification a. The deflection angle at the mirror 805 can deviate from 90°. The optical axis (not illustrated in the drawing) of the deflected optical path 822 preferably impacts the mirror 810 in vertical direction, the optical axis (not illustrated in the drawing) of the optical path 822' likewise preferably impacts the mirror 811 in vertical direction.

Figure 23B:
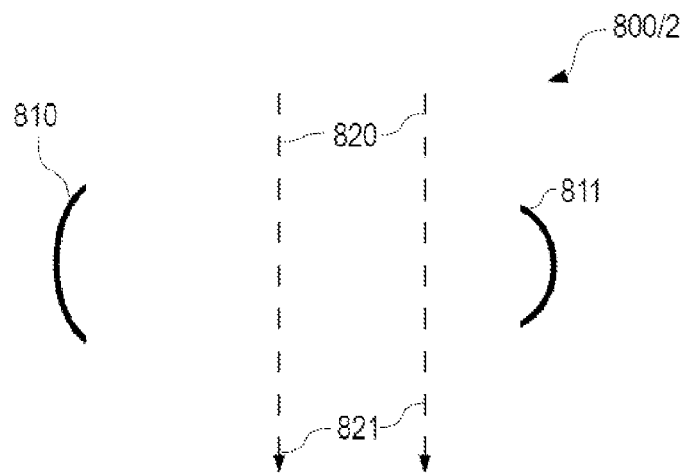

FIG. 23b) shows the arrangement 800, wherein the mirror 805 is in the position/2 (off position) (swiveled out or turned off). The rays pass the arrangement in a substantially unhindered manner. The magnification is thus 1 here.

Figure 23C:
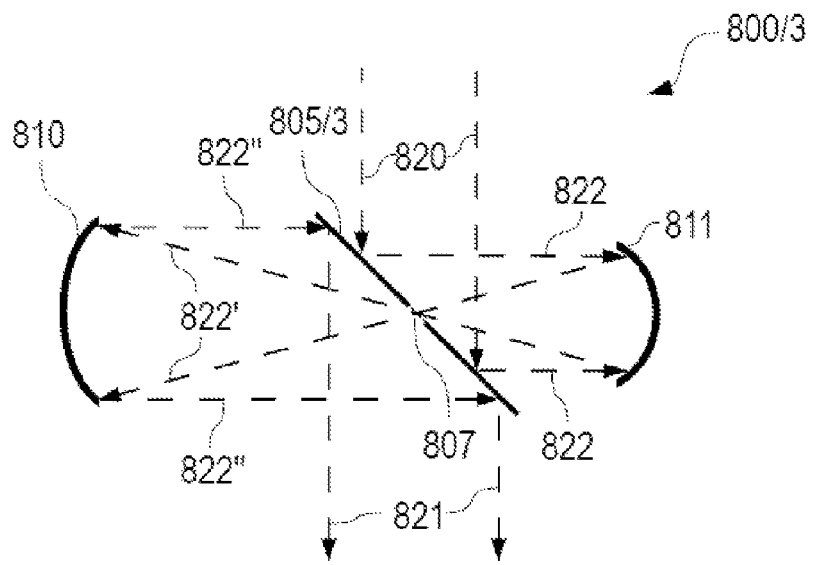

In FIG. 23c), the preferably afocal optical path 820 impacts the coupling mirror 805 (swiveled in or turned on), which is preferably at a 45° angle in position 3 (805/3), is preferably deflected at an angle of 90° as optical path 822 and impacts the mirror having refractive power 811. Here, the rays are reflected back as optical path 822' and are focused in or in the vicinity of the passage opening 807, wherein the passage opening 807 is passed, so as to then further impact the mirror 810. The rays are hereby preferably reflected back as afocal optical path 822" and are deflected by 90° at the mirror 805 and leave the arrangement 800, as preferably afocal optical path 821. In this position of the mirror 805, the magnification of the arrangement has the magnification 1/a. The deflection angle at the mirror 805 can deviate from 90°, the angle of the mirror 805 to the input rays can deviate from the angle 45°. The optical axis (not illustrated in the drawing) of the deflected optical path 822 preferably impacts the mirror 811 in vertical direction, the optical axis (not illustrated in the drawing) of the optical path 822' likewise preferably impacts the mirror 810 in vertical direction.

Similarly as in FIG. 13, the mirrors 800 and 811 having a refractive power not equal to 0 could in each case be replaced with a combination of a lens (or another optical element having a refractive power) and a deflection element, e.g. a flat mirror having refractive power 0.

FIG. 24 shows a further alternative 900 of the magnification changer according to the invention comprising an optical arrangement at right angles to the input optical path. It is a Kepler magnification changer, realized with a mirror and a lens as optical elements having a refractive power: a catadioptic alternative.

In FIG. 24a), the coupling in of the input beam and the coupling between the mirror having a refractive power 910 and of the lens 911 preferably takes place by means of a substantially flat mirror 905, which is preferably mirrored from one side, in position/1 here. The mirror 905 encompasses a borehole or passage opening 907, which can indeed also consist of glass or of a transparent or at least partially transparent material. The passage opening 907 is preferably located substantially in the center of the flat mirror, in particular when the optical axes of the mirror having refractive power 910 and of the lens 911 also substantially run through the center of the mirror 905.

The preferably afocal input rays 920 impact the coupling mirror 905 (swiveled in or turned on), which is preferably at a 45° angle in position 1 (905/1), is preferably deflected at an angle of 90° as optical path 922 and impacts the mirror having refractive power 910. Here, the rays are reflected back as optical path 922' and are focused in or in the vicinity of the passage opening 907, wherein the passage opening 907 is passed, so as to then further impact the lens 911. The optical path passes the lens 911 in position 1 (911/1) and leaves the arrangement 900, as preferably afocal optical path 921. In this position of the mirror 905, the magnification of the arrangement has the magnification a. The deflection angle at the mirror 905 can deviate from 90°. The optical axis (not illustrated in the drawing) of the deflected optical path 922 preferably impacts the mirror 910 in vertical direction, the optical axis (not illustrated in the drawing) of the optical path 292' likewise preferably impacts the lens 911 in vertical direction. The arrangement in this position is also very well suited as telescope, e.g. for observing stars.

FIG. 24a) shows the arrangement 900, wherein the mirror 905 and the lens 911 are both located in position 2 (905/2 or 911/2, respectively). The mirror position can be obtained by rotating a rotatable mirror 905 by 90° from position 1 into position 2 or by turning on a switchable mirror 900/2 and by possibly turning off a further switchable mirror 900 in another position, e.g. position 1. The lens position 2 of the lens 911 can also be carried out by swiveling from position 1 into position 2, preferably by means of a rotary motion. In this switching state, it is thereby only important to override the lens effect of the lens 911/1. In the event that switchable lenses are used, it would thus only be necessary to turn off the lens 911/1, it would not be necessary to turn on the lens 911/2. A further possibility for switching the arrangement would be to couple the rotary motion of the lens 911 and of the mirror 905. In this switching state, the rays pass the arrangement in a substantially unhindered manner. The magnification is thus 1 here. In addition, the mentioned switchable lenses can be made according to US2004/0114203 (Batchko), e.g.

Figure 24C:
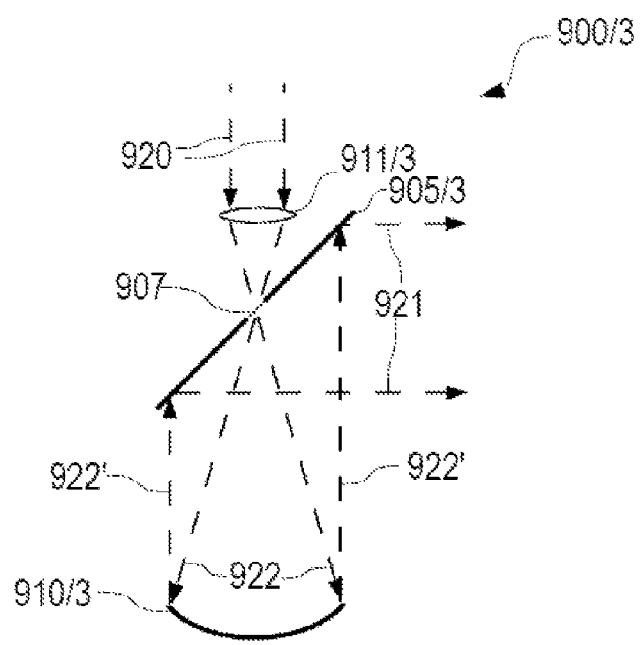

FIG. 24c) shows the arrangement 900 in a third switching state, wherein the mirror 905 and the lens 911 are both in position 3 (905/3 or 911/3, respectively). The mirror position can be obtained by rotating a rotatable mirror 905 by 90° from position 2 into position 3 or by turning on a switchable mirror 900/3 and by possibly turning off a further switchable mirror, e.g. 900 in position 2. The position 3 and 1 differ only in the reflecting side of the mirror. In the event that both sides are embodied in a reflecting manner, the same mirror can be used in switching states 1 and 3. In the event that the movement of the mirror 905 and of the lens 911 are uncoupled, the mirror, which is mirrored on both sides, can also be used for the switching state 3 in position 1. The lens position 3 of the lens 911 can also be carried out by swiveling from position 2 or 1 into position 3, preferably by means of a rotary motion. In the event that switchable lenses are used, the lens 911/3 would have to be turned on and the lens 911/1 would possibly have to be turned off. A further possibility for switching the arrangement would be to couple the rotary motion of the lens 911 and of the mirror 905. The mirrors 905 and the lens 911, which are coupled to one another, could then be brought into position 3 by a rotation from position 1 by −90° or from position 2 by 180° or −180°. For this switching state, a mirror having refractive power 910 in position 3 is also necessary. This can either be reached by means of two different mirrors 900 and 900/3 or by moving the mirror 900 into position 3.

A further catadioptric alternative in Galileo arrangement of the magnification changer according to the invention comprising an optical arrangement at right angles to the remaining optical path is illustrated in FIG. 25. In FIG. 25, the coupling in of the input beam is preferably carried out by means of a substantially flat mirror 1005, which is preferably mirrored from one side. The mirror 1005 encompasses a passage opening 1007, which can be a borehole, but can indeed also consist of glass or a transparent or at least partially transparent material. The passage opening 1007 is preferably located substantially in the center of the flat mirror 1005, in particular when the optical axes of the mirror having refractive power 1010 and of the lens 1011 also run substantially through the center of the mirror 1005.

The preferably afocal input rays 1020 impact the coupling mirror 1005 (swiveled in or turned on), which is preferably at a 45° angle, are preferably deflected at an angle of 90° as optical path 1022 and impact the mirror having refractive power 1010. Here, the rays are reflected back as optical path 1022' and impact the lens 1011 in or in the vicinity of the passage opening 1007, wherein the passage opening 1007 is passed. The optical path is then deflected by 90° at the deflection element 1008 and leaves the arrangement 1000, preferably as afocal optical path 1021. The arrangement has the magnification a here. The deflection angle at the mirror 1005 and 1008 can deviate from 90°. The optical axis (not illustrated in the drawing) of the deflected optical path 1022 preferably impacts the mirror 1010 in vertical direction, the optical axis (not illustrated in the drawing) of the optical path 1022' likewise preferably impacts the lens 1011 in vertical direction. The optional baffle 1009 can prevent scattered light at the lens 1011 or mirror 1008. The switching of this arrangement can be carried out by rotating the partial arrangement of the mirror 1005, mirror 1008 and lens 1011 about the optical axis of the lens 1011 so as to switch magnification from the value a to the value 1/a. The magnification value of 1 is reached by folding the partial arrangement away from the optical path. A further alternative would be without the deflection mirror 1007. The lens 1011 could be arranged behind the passage opening and the baffle 1009 could be omitted. The switching would then take place similarly as in the arrangement from FIG. 24. The derivation is obvious to the person of skill in the art and he will forgo it here. Following the example of the arrangement from FIG. 25, the optical path 922' in FIG. 24a) can be deflected by 90°, e.g., between the focus and lens 911 with the help of a mirror. The switching processes would then run in a similarly simple manner as in the arrangement according to FIG. 25.

Following the examples of FIGS. 17 and 23, a magnification changer comprising considerably more than two or three magnification stages is possible. FIG. 26 shows such a magnification changer according to the invention comprising an optical arrangement at right angles to the remaining optical path. The coupling in of the input beam and the coupling between the two active mirrors having a refractive power 810 and 811 preferably takes place by means of a substantially flat mirror 905, which is preferably mirrored from both sides, in position/1 here, comprising a passage opening 807, which can be a borehole or which can indeed also consist of glass or of a transparent or at least partially transparent material. The passage opening 807 is preferably located substantially in the center of the flat mirror, in particular when the optical axes of the mirrors having refractive power 810 and 811 also substantially run through the center of the mirror 805. In the illustrated state, the switchable mirrors having refractive power 813 and 812 are switched to passage and are not active, the switchable mirror having refractive power 810 is switched to reflection and is thus active. The preferably non-switchable mirror having refractive power 811 is active, because the switchable mirror 812, which is located in front of it in the optical path to the right of the focus, is switched to passage. The preferably non-switchable mirror having refractive power 814 is not active, because the switchable mirror 812, which is located in front of it in the optical path to the left of the focus, is witched to reflection. The currently active mirrors were indicated by means of continuous lines, the non-active mirrors by means of dashed line.

The preferably afocal input rays 820 impact the coupling mirror 805 (swiveled in or turned on), which is preferably at a 45° angle in position 1 (805/1), are preferably deflected at an angle of 90° as optical path 822, pass the mirror 813, which is switched to transmission, and impact the mirror having refractive power 810. Here, the rays are reflected back as optical path 822', again pass the mirror 813, which is switched to transmission, and are focused in or in the vicinity of the passage opening 807, wherein the passage opening 807 is passed, so as to then further pass the mirror 812, which is switched to transmission, and so as to impact the mirror 811. The rays are here preferably reflected back as afocal optical path 822", pass the mirror 812 switched to transmission, are deflected by 90° at the mirror 805 and leave the arrangement 800 as preferably afocal optical path 821. In this position of the mirror 805, the magnification of the arrangement has the magnification a. The deflection angle at the mirror 805 can deviate from 90°. The optical axis (not illustrated in the drawing) of the deflected optical path 822 preferably impacts the mirror 810 in vertical direction, the optical axis (not illustrated in the drawing) of the optical path 822' likewise preferably impacts the mirror 811 in vertical direction. The course of the rays is analogous in other switching states, the active mirrors 812 and 810 must be replaced with the respective currently active mirrors. One mirror becomes active in that the switchable mirrors located in front of it in the optical path on its side of the focus are switched to transmission, and the mirror itself is switched to reflection or when it is reflective anyway, as the preferably non-switchable mirrors, which are in each case farthest away from the focus.

Further discussions of the switching states and of the magnification stages are made analogously to the descriptions relating to FIGS. 17 and 23. The arrangement from FIG. 26 encompasses a total of 13 magnification stages with the five mirrors having a refractive power, three of which are switchable, and with the three switching states of the mirror 805. The number of the mirrors and in particular of the switchable mirrors can vary and thus also the number of the magnification stages. In the event that the number of the mirrors is m on one side of the focus and is n on the other side of the focus, the number of magnification stages is $2 \cdot (n \cdot m) + 1$ in the case of three switching states of the mirror 805, the number of the magnification stages is $(n \cdot m) + 1$ or $2 \cdot (n \cdot m)$ in the case of two switching states, depending on the selection of the switching states.

Similarly as in FIG. 13, the mirrors having a refractive power not equal to 0 could be replaced by a combination of a lens (or another optical element having a refractive power) and a deflection element, e.g. a flat mirror having a refractive power 0, wherein the switchable mirrors could in each case be replaced with switchable versions of the lenses and flat mirrors. In addition, this also applies to the other arrangements described here.

FIG. 27 shows a camera 1100 comprising a switching lens and coupling according to the invention with three mirrors, at least two of which can be switched. The input rays 1120 of the object, which is to be imaged (not in FIG. 27), impacts the coupling mirror 1105, which is preferably at a 45° angle, is preferably deflected at an angle of 90° as optical path 1122, passes the mirror 1113, which is switched to transmission, and impacts the mirror having refractive power 1110, which is switched to reflection. Here, the rays are reflected back as optical path 1122', again pass the mirror 1113, which is switched to transmission, and are preferably focused behind the passage opening 1107, wherein an image of the object is created on the image recording device 1130. So that a sharp image can in each case be created in response to different object distances, the relative distance between the lens mirror 1110 (or 1114 or 1113) is held to be variable, e.g. the image recording device 1130 can be designed to be movable. In the alternative, a focusing device, e.g. of at least one element having a variable refractive power, e.g. lenses having a variable refractive power, can be arranged in front of the image recording device 1130. Such lenses are supplied, e.g., by Varioptic, France, Holochip, USA or Optotune, Switzerland. The instant invention corresponds to a camera comprising three prime lenses. The other focal lengths are attained by means of different switching combinations of the switchable mirrors 1110 and 1113 and are supplied by the mirror 1114 or the mirror 1113, which s switched to reflection. It goes without saying that a camera comprising a different number of switchable mirrors and thus with a different number of integrated prime lenses is also possible. The coupling mirror can be forgone and the rays coming from the object could fall directly onto one of the mirrors 1114, 1110 or 1113, similarly as in FIG. 31 or could be reflected. However, diffraction effects would then have to be accepted at the fastening mechanism and the supply lines of the image recording device 1130.

FIG. 28 shows a further magnification changer 1200 according to the invention, comprising an optical arrangement at right angles to the remaining optical path. It is a further catadioptic alternative and a further Galileo arrangement. The coupling of the input beam 1220 is preferably carried out by means of a substantially flat mirror 1205. The mirror 1205 encompasses a passage opening 1207, which can be a borehole, but can indeed also consist of glass or a transparent or at least partially transparent material. The passage opening 1207 is preferably located substantially in the center of the flat mirror 1205, in particular when the optical axes of the mirror having refractive power 1210 and 1211 also run substantially through the center of the mirror 1205.

The preferably afocal input rays 1220 impact the coupling mirror 1205, which is preferably at a 45° angle, are preferably deflected at an angle of 90° as optical path 1222 and impact the mirror having refractive power 1210. Here, the rays are reflected back as optical path 1222' and impact the mirror having refractive power 1211 preferably directly behind the passage opening 1207. The light is reflected back by the mirror 1211 and laves arrangement 1200, as preferably afocal optical path 1221 through the passage opening in the mirror 1210. The arrangement has the magnification a here. The deflection angle at the mirror 1205 can deviate from 90°. The switching of this arrangement can be carried out by rotating the arrangement about the vertical on the mirror 1205, which simultaneously intersects the optical axes of the optical paths in the passage opening. Magnification 1/a and 1 are thereby reached, e.g. in response to a rotation by 180° and 90°, respectively. The uncoupling of the optical path 1221 could also be carried out by means of a small flat mirror, approximately in the size of the optical path 1221, attached in the very optical path 1221. However, such an arrangement would be difficult to switch and could rather only be used as a telescope.

A more compact alternative 1300 of arrangement 1200 from FIG. 28 is shown in FIG. 29. This is a further magnification changer 1300 according to the invention comprising an optical arrangement at right angles to the remaining optical path. It is a further catadioptric alternative and a further Galileo arrangement. The coupling in of the input beam 1320 is preferably carried out by means of a substantially flat mirror 1305. The mirror 1305 encompasses a passage opening 1307, which can be a borehole, but can indeed also consist of glass or a transparent or at least partially transparent material. The passage opening 1307 is preferably located substantially in the center of the flat mirror 1305, at a certain distance from the center of the mirror 1305. This distance depends on the presence of a coupling/uncoupling selector of the mirror 1305 in the center of the mirror about the optical axes of the mirrors 1310 and 1311. This coupling/uncoupling selector of the mirror 1305 is arranged within the passage opening 1307, substantially in the center of the passage opening 1307. This coupling/uncoupling selector of the mirror 1305 and the passage opening 1307 are slightly asymmetrical, due to the inclination angle of the mirror 1305 against the optical axes of the mirrors 1310 and 1311. The projection of the mirror 1305 could be symmetrical onto a plane vertically to the optical axes of the mirrors having refractive power 1310 and 1311. In the case of the circular optical path, the projection would preferably form three concentric circles, with the outer part of the mirror 1305, which coupled in exclusively, on the outside, the passage opening being further on the inside and the coupling/uncoupling selector being the center. In the case of a rectangular or square optical path, the projection would correspondingly form concentric rectangles or squares, which are nested inside each other. These remarks also pertain to the other arrangements, which use the coupling mirror.

The preferably afocal input rays 1320 impact the coupling mirror 1305, which is preferably at a 45° angle, are preferably deflected at an angle of 90° as optical path 1322 and impact the mirror having refractive power 1310. Here, the rays are reflected back as optical path 1322', pass the passage opening 1307 and impact the mirror having refractive power 1311. The light is reflected back by the mirror 1311 and laves arrangement 1300, as preferably afocal optical path 1321 after reflection and deflection by 90° at the uncoupling side of the coupling/uncoupling selector of mirror 1305. The arrangement has the magnification a here. The deflection angle at the mirror 1305 can deviate from 90°. The switching of this arrangement into magnification 1/a can be carried out by rotating the arrangement about the optical axes of the mirrors 1310 and 1311. Optionally, the switching into magnification 1/a can be carried out by rotating the mirror 1305 alone or only with mirror 1311. The switching into magnification 1 can be carried out by swiveling away from the optical path of the mirror 1305 alone or with the mirror 1311.

A further purely lens-optical alternative in Kepler arrangement of the magnification changer according to the invention comprising an optical arrangement at right angles to the remaining optical path is shown in FIG. 30. The coupling in of the input beam 1420 is carried out by means of the lens 1410 and preferably by means of a substantially flat mirror 1405. The mirror 1405 encompasses a passage opening 1407, which can be a borehole, but can indeed also consist of glass or a transparent or at least partially transparent material. The passage opening 1407 is preferably located substantially in the center of the flat mirror 1405.

The preferably afocal input rays 1420 impact the lens 1410, pass it and impact the coupling mirror 1405, which is preferably at a 45° angle, are preferably deflected at an angle of 90° as optical path 1422 and impact the flat mirror 1304. Here, the rays are reflected back and pass the passage opening 1407, wherein the focus of the rays is located in or in the vicinity of the passage opening 1407. Embodied as flat mirror, the optical path is then reflected back at the deflection element 1404, is then deflected by 90° at the mirror 1405, impacts the lens 1411 and leaves the arrangement 1400 as a preferably afocal optical path 1421. The arrangement has the magnification a here. The deflection angle at the mirror 1405 can deviate from 90°. The switching of this arrangement can be carried out by rotating the partial arrangement of the mirror 1405, lens 1410 and lens 1411 about the optical axis of the optical path between the mirrors 1403 and 1404 (not in the drawing) by 180°, so as to switch magnification from the value a to the value 1/a. The magnification value of 1 is attained by folding the partial arrangement away from the optical path. As do all of the arrangements according to the invention, the arrangement can be used as telescope or head-worn magnifying glass or the like. Occasionally, the afocality of the coupling and/or uncoupling rays is thereby forgone.

Further solutions, which do not require a particular further flat coupling mirror, are illustrated in FIGS. 31 and 32, A first arrangement, which uses the Galileo optical path, can be seen in FIG. 31. The preferably afocal optical path 1520 impacts the mirror having refractive power 1510, is reflected as convergent optical path 1522, impacts the mirror having refractive power 1511, is reflected as preferably afocal optical path 1521 and leaves the arrangement through the passage opening 1507. The passage opening 1507 can be a borehole, but can indeed also consist of glass or of a transparent or at least partially transparent material. The magnification of the imaged configuration shall be a. The arrangement can be switched from the magnification a to the magnification 1/a by rotating about an axis, which is vertical to the optical paths 1520 and 1521 and which is arranged between the two mirrors 1510 and 1511. The magnification 1 is attained by folding the arrangement away from the optical path. However, it is considerably more elegant to supplement the arrangement by a further substantially same arrangement, which was rotated by 180°, and to thereby embody all mirrors as switching mirrors. The arrangements can be spatially nested inside one another. When the first arrangement is turned on and the second arrangement is turned off, the magnification is then a. When the first arrangement is turned off and the second arrangement is turned on, the magnification is then 1/a and 1 when both arrangements are turned off.

Figures 32A, 32B:
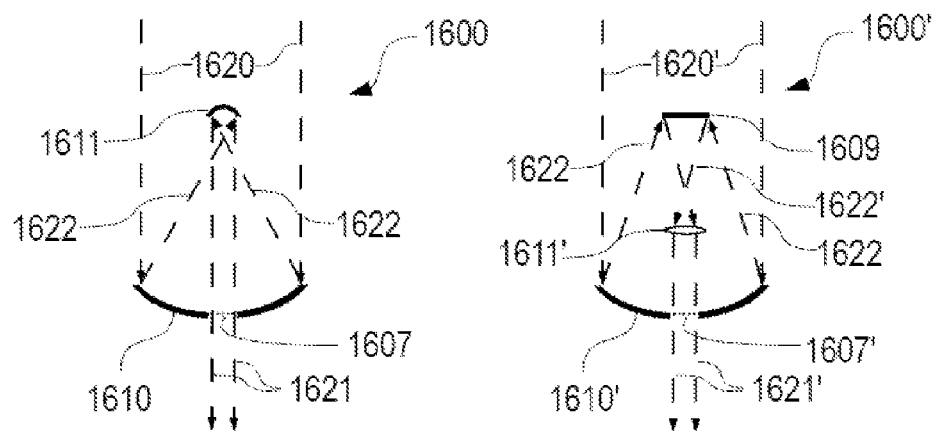

A further arrangement without a flat coupling mirror, but in Kepler arrangement can be seen in FIGS. 32a) and b), wherein the pure mirror solution was illustrated in FIG. 32a), the catadioptric embodiment was shown in FIG. 32b). In FIG. 32a), the preferably afocal optical path 1620 impacts the mirror having refractive power 1610, is reflected and focused as optical path 1622, impacts the mirror having refractive power 1611 on the other side of the focus, is reflected as preferably afocal optical path 1621 and leaves the arrangement through the passage opening 1607. The passage opening 1607 can be a borehole, but can indeed also consist of glass or of a transparent or at least partially transparent material. The magnification of the imaged configuration shall be a. The arrangement can be switched from the magnification a to the magnification 1/a by rotating about an axis, which is vertical to the optical paths 1620 and 1621 and which is arranged between the two mirrors 1610 and 1611. The magnification 1 is attained by folding the arrangement away from the optical path. However, it is considerably more elegant to supplement the arrangement by a further substantially same arrangement, which was rotated by 180°, and to thereby embody all mirrors as switching mirrors. The arrangements can be spatially nested inside one another. When the first arrangement is turned on and the second arrangement is turned off, the magnification is then a. When the first arrangement is turned off and the second arrangement is turned on, the magnification is then 1/a and 1 when both arrangements are turned off.

In FIG. 32b), the preferably afocal optical path 1620' impacts the mirror having refractive power 1610', is reflected as convergent optical path 1622, impacts the preferably flat mirror 1609, is further reflected as preferably convergent optical path 1622', passes the focus and then the lens 1611' and leaves the arrangement through the passage opening 1607 as preferably afocal optical path 1621'. The passage opening 1607 can be a borehole, but can indeed also consist of glass or of a transparent or at least partially transparent material. The magnification of the imaged configuration shall be a. The arrangement can be switched from the magnification a to the magnification 1/a by rotating about an axis, which is vertical to the optical paths 1620' and 1621' and which is arranged between the two mirrors 1610' and 1609. The magnification 1 is attained by folding the arrangement away from the optical path. However, it is considerably more elegant to supplement the arrangement by a further substantially same arrangement, which was rotated by 180°, and to thereby embody all mirrors as switching mirrors and to also embody the lens as switching lens. The arrangements can be spatially nested inside one another. When the first arrangement is turned on and the second arrangement is turned off, the magnification is then a. When the first arrangement is turned off and the second arrangement is turned on, the magnification is then 1/a and 1 when both arrangements are turned off. Preferably, both arrangements can be positioned such that the lenses are in each case arranged at the same location, so that they effectively require only one lens.

The passage opening from FIGS. 23-32 can be realized so as to vary in size, in that the coupling or uncoupling mirror, respectively, comprises at least one sector, which is embodied as switchable mirror.

In addition, the introduced arrangements cannot only be used as magnification changers. A use as head-worn magnifying glass, binoculars or telescope, and the like, would also be possible. However, the demand for afocality at the input and/or output of the arrangement would then need to be given up in some cases.

When comparing the solutions according to the invention, important advantages as compared to the state of the art become apparent immediately: the solutions are preferably realized in one plane, preferably in that of the optical path. This results in a rather compact design, which lies substantially in the dimensions of a common magnification changer. By folding the optical path, however, it provides for a considerably optical path, which is reflected in a very high optical quality and/or a large magnification range. The solution is also suitable for the use of a Kepler arrangement. The movable mechanics is eliminated, which means a further space advantage, or it is small, cheap and simple (preferably exclusively rotary motions). Compared to the state of the art, the changing cycles run extremely quickly and require little energy, the mechanics are thus suitable for mobile applications. The arrangement can be cascaded, it can thus provide many magnification stages. It is quick, because the moved mass (e.g. thin mirror) is small as compared to the mass of a plurality of lenses, which are moved in the state of the art. The levers are also small and the paths are very short. Even the mechanical solutions are already 1-2 times faster than the state of the art. Switching process can even be realized within the millisecond range by using switches without any movable parts.

The development of the magnification changers according to the invention can be adapted to the respective problem easily and quickly. The development costs are thus low. In terms of effort as well as absolutely, the arrangements according to the invention offer a very high optical quality. The weight is low. The number of the magnification stages in the cascades increases exponentially with the number of the optical elements, instead of linearly as in the state of the art. A zoom-like operation is possible, wherein the speed of the detuning is partially much higher than in the case of the state of the art, where it is moved by the mechanics.

In the introduced arrangements, the Galileo and Kepler arrangements can virtually be replaced with one another, when considering that the Kepler arrangement, contrary to the Galileo arrangement, creates an intermediate image and causes an image reversal, and when taking or using, respectively, corresponding measures, which are known to the person of skill in the art, e.g. an image reversal device, which can be swiveled in, or a special software operation for the occasional image reversal in the case of a camera chip detector.

Due to no or few parts, which are not moved much, the arrangement is also very robust, which, in turn, favors mobile applications. In the case of scientific applications, the reproducibility of the magnification is valued.

It goes without saying that the different arrangements according to the invention and partial arrangement according to the instant application can be combined with one another.

The invention claimed is:

1. An optical arrangement for varying a magnification in an optical path, wherein this optical arrangement as a whole encompasses at least two different possible magnifications, comprising:
   a first optical element having optical power,
   a second optical element having optical power being spaced from the first optical element,
   an optical switch having a switching element by which light is propagated in a choice of directions at a common intersection,
   an entering optical path along which light propagates into the optical arrangement,
   an exiting optical path along which the light propagates out of the optical arrangement,
   a first magnification path along which the light encounters one or more of the first and second optical elements for effecting a first amount of magnification,
   a second magnification path along which the light encounters one or more of the first and second optical elements for effecting a second amount of magnification,
      wherein the second magnification path is the same as the first magnification path except for reverse direction,
   the optical switch being switchable between a first state at which the switching element directs light from the entering optical path through the common intersection to the first magnification path and a second state at which the switching element directs light from the entering optical path through the common intersection to the second magnification path.

2. The optical arrangement according to claim 1 in which the switching element further directs light in the first state from the first magnification path through the common intersection to the exiting optical path and the switching element further directs light in the second state from the second magnification path through the common intersection to the exiting optical path.

3. The optical arrangement according to claim 2 in which the first and second magnification paths form respective optical loops that begin and end at the common intersection at which the switching element further propagates the light in the choice of directions.

4. The optical arrangement according to claim 1 in which the optical switch is switchable between the first state, the second state, and a third state at which the switching element directs light from the entering optical path through the common intersection to the exiting optical path.

5. The optical arrangement according to claim 1 in which the first optical element has refractive optical power and the second optical element has refractive optical power in the form of a Galileo or a Kepler telescope.

6. The optical arrangement according to claim 5 in which at least one of the entering optical path and the exiting optical path of the arrangement is afocal.

7. The optical arrangement according to claim 1 in which the optical switch has 4 switching states.

8. The optical arrangement according to claim 1 in which the switching element propagates light in the first state through the common intersection by transmission and propagates light in the second state through the common intersection by reflection.

9. The optical arrangement according to claim 1 in which the switching element remains stationary while switching between the first and second states.

10. The optical arrangement according to claim 1 in which the switching element acts in at least one of a reflective, optically diffractive, and wave-guiding manner.

11. The optical arrangement according to claim 10 in which the switching element includes at least one of a mirror, a prism, an optical lattice, and a DOE.

12. The optical arrangement according to claim 1 in which the first optical element includes a lens and the second optical element includes a mirror.

13. The optical arrangement according to claim 1 in which at least one of the first and second optical elements has variable optical power.

14. The optical arrangement according to claim 13 in which the at least one optical element having a variable optical power is arranged for at least one of a zoom, an autofocus, an optical image stabilization, and a residual correction of the optical errors of the arrangement.

15. The optical arrangement according to claim 1 in which the arrangement set forth in claim 1 comprises a first magnification changer and further comprising at least one additional magnification changer of the same recited arrangement along the optical path.

16. The optical arrangement according to claim 15 in which the additional magnification changer includes at least one of a continuous optical zoom, a zoom with lenses having variable refractive power, a digital zoom, a Galileo changer, a Kepler changer, a changer with intermediate image, and a changer without intermediate image.

17. An optical cascade including at least two optical arrangements, in which the optical arrangement of claim 1 is a first of the at least two optical arrangements, and a second of the at least two optical arrangements includes:
   a second optical switch,
   a second entering optical path, and
   a second exiting optical path, and
   two magnification paths,
   the second optical switch is switchable between states at which light from the second entering optical path is directed through a second common intersection to one or the other of the two magnification paths, and
   the exiting optical path of the first optical arrangement is coincident with entering the optical path of the second optical arrangement.

18. The optical cascade according to claim 17 in which at least one of the first and second optical switches includes a state in which at least one of the light from the entering optical path of the first optical arrangement is directed through the common intersection of the first optical arrangement to the first exiting optical path of the first optical arrangement and the light from the second entering optical path is directed through the second common intersection to the second exiting optical path.

19. The optical cascade according to claim 17 further comprising a third optical arrangement including
   a third optical switch,
   a third entering optical path,
   a third exiting optical path,
   and two more magnification paths,
   the third optical switch being switchable between states at which light from the third entering optical path is directed through a third common intersection to one or the other of the two more magnification paths, and
   the second exiting optical path of the second optical arrangement is coincident with the third entering optical path of the third optical arrangement.

20. The optical arrangement according to claim 1 in which the switching element includes one of
   (a) switchable mirror that remains stationary,
   (b) a switchable mirror that is pivotable about an axis,
   (c) a switchable lens, (d) a moveable polarizer,
(e) a polarization rotator, and
(f) a switchable polarization cube.

21. An optical arrangement for varying a magnification in an optical path, wherein this optical arrangement as a whole encompasses at least two different possible magnifications, comprising:
- a first optical element having optical power different from zero,
- a second optical element having optical power different from zero and being spaced apart from the first optical element,
- a common intersection comprising:
  - exactly one entrance to the optical arrangement for the optical beam,
  - exactly one exit from the optical arrangement for the optical beam, and
  - an optical switch for changing the magnification in the optical path,
  - wherein the optical beam enters the arrangement through the entrance at the common intersection for changing the magnification between the at least two different possible magnifications, and wherein the optical beam exits the arrangement through the exit at the common intersection.

22. An optical arrangement for varying a magnification in an optical path for an optical beam, wherein this optical arrangement as a whole encompasses at least two different possible magnifications, comprising
- a first optical element having optical power different from zero,
- a second optical element having optical power different from zero and being spaced apart from the first optical element,
  - the first and the second optical element building a telescope arrangement,
- a common intersection comprising:
  - exactly one entrance to the optical arrangement for an optical beam,
  - exactly one exit from the optical arrangement for the optical beam and
  - an optical switch for changing the magnification in the optical path,
  - wherein the optical switch directs the optical beam into the optical arrangement and wherein the optical beam passes the first optical element and the second optical element, in this order, for the first magnification, and
  - wherein the optical beam passes the second optical element and the first optical element, in this order, for the second magnification.

23. The optical arrangement according to claim 21, wherein the first optical element and the second optical element are located inside of the arrangement between the entrance of the arrangement and the exit of the arrangement.

24. The optical arrangement according to claim 21, wherein the first optical element and the second optical element are located outside the common intersection.

25. The optical arrangement according to claim 21, wherein the first optical element and the second optical element form a telescope arrangement.

26. The optical arrangement according to claim 21, wherein there is exactly one common intersection and exactly one optical switch.

* * * * *